US011080797B2

(12) United States Patent
Law et al.

(10) Patent No.: US 11,080,797 B2
(45) Date of Patent: Aug. 3, 2021

(54) VIEWING SHOPPING INFORMATION ON A NETWORK BASED SOCIAL PLATFORM

(71) Applicant: eBay Inc., San Jose, CA (US)

(72) Inventors: Philip Law, San Jose, CA (US); Yuan Der Ho, San Mateo, CA (US); Choon Chong, Melaka (MY); Rolf Skyberg, Campbell, CA (US); Massimiliano Mancini, San Jose, CA (US); Adam Trachtenberg, San Francisco, CA (US); Trisha Lee Okubo, New York, NY (US)

(73) Assignee: eBay Inc., San Jose, CA (US)

(*) Notice: Subject to any disclaimer, the term of this patent is extended or adjusted under 35 U.S.C. 154(b) by 0 days.

(21) Appl. No.: 16/411,346

(22) Filed: May 14, 2019

(65) Prior Publication Data
US 2019/0266678 A1 Aug. 29, 2019

Related U.S. Application Data

(63) Continuation of application No. 15/865,894, filed on Jan. 9, 2018, now Pat. No. 10,339,613, which is a (Continued)

(51) Int. Cl.
G06Q 30/00 (2012.01)
G06Q 50/00 (2012.01)
(Continued)

(52) U.S. Cl.
CPC ............. G06Q 50/01 (2013.01); G06Q 30/02 (2013.01); G06Q 30/0601 (2013.01);
(Continued)

(58) Field of Classification Search
CPC ................. G06Q 30/0601–0645; G06Q 30/80
(Continued)

(56) References Cited

U.S. PATENT DOCUMENTS 5,950,172 A   9/1999   Klingman
6,567,797 B1  5/2003   Schuetze et al.
(Continued)

FOREIGN PATENT DOCUMENTS

KR   10-1160404 B1    7/2012
WO   2006/050278 A2   5/2006
(Continued)

OTHER PUBLICATIONS

US 8,209,230 B2, 06/2012, Chong et al. (withdrawn)
(Continued)

Primary Examiner — Mila Airapetian
(74) Attorney, Agent, or Firm — Faegre Drinker Biddle & Reath LLP

(57) ABSTRACT

A system for viewing shopping information on a social networking platform is disclosed. At the social networking platform, the system receives a request from a user device corresponding to a first user of the social networking platform to view a list of a second user of the social networking platform. The list may include items offered for transaction on a network-based commerce server. In response to receiving the request from the user device, the system forwards the request to the network-based commerce server, and then receives updated information for at least one item on the list from the network-based corner server. Then, the system communicates the updated information received from the network-based commerce server to the user device.

20 Claims, 16 Drawing Sheets

Related U.S. Application Data continuation of application No. 14/720,814, filed on May 24, 2015, now Pat. No. 9,892,471, which is a continuation of application No. 13/858,495, filed on Apr. 8, 2013, now Pat. No. 9,043,227, which is a continuation of application No. 13/033,354, filed on Feb. 23, 2011, now Pat. No. 8,417,577, which is a continuation of application No. 11/963,426, filed on Dec. 21, 2007, now Pat. No. 7,945,482.

(60) Provisional application No. 60/957,645, filed on Aug. 23, 2007.

(51) Int. Cl.
*G06Q 30/02* (2012.01)
*G06Q 30/06* (2012.01)
*H04L 29/06* (2006.01)

(52) U.S. Cl.
CPC ..... *G06Q 30/0609* (2013.01); *G06Q 30/0631* (2013.01); *G06Q 30/0633* (2013.01); *G06Q 30/0641* (2013.01); *H04L 67/42* (2013.01)

(58) Field of Classification Search
USPC ..... 705/26.1, 26.2, 26.25, 26.3, 26.35, 26.4, 705/26.41, 26.42, 26.43, 26.44, 26.5, 705/26.6, 26.61, 26.62, 26.63, 26.64, 705/26.7, 26.8, 26.81, 26.82, 26.9, 27.1, 705/27.2
See application file for complete search history.

(56) References Cited

U.S. PATENT DOCUMENTS

| | | |
|---|---|---|
| 6,587,835 B1 | 7/2003 | Treyz et al. |
| 6,604,107 B1 | 8/2003 | Wang |
| 6,745,178 B1 | 6/2004 | Emens et al. |
| 6,968,179 B1 | 11/2005 | De Vries |
| 7,197,475 B1 | 3/2007 | Lorenzen et al. |
| 7,356,490 B1 | 4/2008 | Jacobi et al. |
| 7,363,214 B2 | 4/2008 | Musgrove et al. |
| 7,444,297 B2 | 10/2008 | Shah |
| 7,519,562 B1 | 4/2009 | Vander Mey et al. |
| 7,571,121 B2 | 8/2009 | Bezos et al. |
| 7,657,523 B2 | 2/2010 | Ebanks |
| 7,707,122 B2 | 4/2010 | Hull et al. |
| 7,716,089 B1 | 5/2010 | Gavarini |
| 7,720,722 B2 | 5/2010 | Ho et al. |
| 7,751,807 B2 | 7/2010 | Lin et al. |
| 7,752,082 B2 | 7/2010 | Calabria |
| 7,783,980 B1 | 8/2010 | Herold |
| 7,881,969 B2 | 2/2011 | Wiseman et al. |
| 7,945,482 B2 | 5/2011 | Law et al. |
| 7,996,270 B2 | 8/2011 | Sundaresan |
| 8,001,010 B2 | 8/2011 | Ho et al. |
| 8,224,897 B2 | 7/2012 | Kanazawa et al. |
| 8,392,270 B2 | 3/2013 | Ho et al. |
| 8,392,271 B2 | 3/2013 | Ho et al. |
| 8,417,577 B2 | 4/2013 | Law et al. |
| 8,438,069 B2 | 5/2013 | Chong et al. |
| 8,560,385 B2 | 10/2013 | Atazky et al. |
| 8,560,397 B2 | 11/2013 | Chong et al. |
| 8,706,560 B2 | 4/2014 | Sundaresan |
| 8,725,573 B1 | 5/2014 | Narang et al. |
| 9,037,503 B2 | 5/2015 | Ho et al. |
| 9,043,227 B2 | 5/2015 | Law et al. |
| 9,092,819 B2 | 7/2015 | Chong et al. |
| 9,208,517 B1 | 12/2015 | Boggie et al. |
| 9,892,471 B2 | 2/2018 | Law et al. |
| 10,339,613 B2 | 7/2019 | Law et al. |
| 10,984,126 B2 | 4/2021 | Ho et al. |
| 2002/0055868 A1 | 5/2002 | Dusevic et al. |
| 2002/0055878 A1 | 5/2002 | Burton et al. |
| 2004/0172456 A1 | 9/2004 | Green et al. |
| 2004/0177009 A1 | 9/2004 | Schrenk et al. |
| 2005/0102227 A1 | 5/2005 | Solonchev |
| 2005/0154639 A1 | 7/2005 | Zetmeir |
| 2005/0198031 A1 | 9/2005 | Pezaris et al. |
| 2005/0276277 A1 | 12/2005 | Pace |
| 2005/0288958 A1 | 12/2005 | Eraker et al. |
| 2006/0026119 A1 | 2/2006 | Mirrashidi et al. |
| 2006/0031869 A1 | 2/2006 | Bruner |
| 2006/0085253 A1 | 4/2006 | Mengerink et al. |
| 2006/0085259 A1 | 4/2006 | Nicholas et al. |
| 2006/0117378 A1 | 6/2006 | Tam et al. |
| 2006/0149625 A1 | 7/2006 | Koningstein |
| 2006/0161484 A1 | 7/2006 | Pandhe |
| 2006/0190281 A1 | 8/2006 | Kott et al. |
| 2006/0218153 A1 | 9/2006 | Voon et al. |
| 2006/0235764 A1 | 10/2006 | Bamborough et al. |
| 2006/0239648 A1 | 10/2006 | Varghese |
| 2006/0271460 A1 | 11/2006 | Hanif |
| 2006/0293967 A1 | 12/2006 | Deluca |
| 2007/0106551 A1 | 5/2007 | Mcgucken |
| 2007/0130164 A1 | 6/2007 | Kembel et al. |
| 2007/0150359 A1 | 6/2007 | Lim et al. |
| 2007/0150368 A1 | 6/2007 | Arora et al. |
| 2007/0156594 A1 | 7/2007 | Mcgucken |
| 2007/0168216 A1 | 7/2007 | Lemelson |
| 2007/0168463 A1 | 7/2007 | Rothschild |
| 2007/0208627 A1 | 9/2007 | Abadi |
| 2007/0211047 A1 | 9/2007 | Doan |
| 2007/0220540 A1 | 9/2007 | Walker et al. |
| 2007/0239552 A1 | 10/2007 | Sundaresan |
| 2007/0244769 A1 | 10/2007 | Boesel |
| 2007/0288468 A1 | 12/2007 | Sundaresan et al. |
| 2008/0040673 A1 | 2/2008 | Zuckerberg et al. |
| 2008/0077473 A1 | 3/2008 | Allin-Bradshaw et al. |
| 2008/0109239 A1 | 5/2008 | Harmon et al. |
| 2008/0154632 A1 | 6/2008 | Jacobi et al. |
| 2008/0189188 A1 | 8/2008 | Morgenstern |
| 2008/0189189 A1 | 8/2008 | Morgenstern |
| 2008/0228595 A1 | 9/2008 | Hill et al. |
| 2008/0300982 A1 | 12/2008 | Larson et al. |
| 2008/0301007 A1 | 12/2008 | Horel et al. |
| 2008/0313256 A1 | 12/2008 | Kanazawa et al. |
| 2008/0320004 A1 | 12/2008 | Jain et al. |
| 2008/0320139 A1 | 12/2008 | Fukuda et al. |
| 2009/0055285 A1 | 2/2009 | Law |
| 2009/0055291 A1 | 2/2009 | Ho et al. |
| 2009/0055292 A1 | 2/2009 | Chong et al. |
| 2009/0083096 A1 | 3/2009 | Cao et al. |
| 2009/0265253 A1 | 10/2009 | Gabriel et al. |
| 2010/0023418 A1 | 1/2010 | Bader et al. |
| 2010/0153378 A1 | 6/2010 | Sardesai |
| 2010/0205066 A1 | 8/2010 | Ho et al. |
| 2010/0332283 A1 | 12/2010 | Ng et al. |
| 2011/0035295 A1 | 2/2011 | Lifson |
| 2011/0040602 A1 | 2/2011 | Kurani |
| 2011/0078055 A1 | 3/2011 | Faribault et al. |
| 2011/0145105 A1 | 6/2011 | Law et al. |
| 2011/0153451 A1 | 6/2011 | Bitz |
| 2011/0173191 A1 | 7/2011 | Tsaparas et al. |
| 2011/0184780 A1 | 7/2011 | Alderson et al. |
| 2011/0264556 A1 | 10/2011 | Ho et al. |
| 2011/0264557 A1 | 10/2011 | Ho et al. |
| 2011/0264567 A1 | 10/2011 | Clyne |
| 2012/0116905 A1 | 5/2012 | Futty et al. |
| 2012/0253966 A1 | 10/2012 | Chong et al. |
| 2012/0265635 A1 | 10/2012 | Forsblom |
| 2013/0030949 A1 | 1/2013 | Sundaresan |
| 2013/0085792 A1 | 4/2013 | Klein |
| 2013/0132221 A1 | 5/2013 | Bradford et al. |
| 2013/0179948 A1 | 7/2013 | Ho et al. |
| 2013/0191723 A1 | 7/2013 | Pappas et al. |
| 2013/0218715 A1 | 8/2013 | Sundaresan |
| 2013/0226732 A1 | 8/2013 | Law et al. |
| 2013/0346239 A1 | 12/2013 | Chong et al. |
| 2014/0006389 A1 | 1/2014 | Garcia et al. |
| 2014/0331143 A1 | 11/2014 | Herold |
| 2015/0242652 A1 | 8/2015 | Ho et al. |
| 2015/0262315 A1 | 9/2015 | Law et al. |

(56) References Cited

U.S. PATENT DOCUMENTS

| | | |
|---|---|---|
| 2015/0310569 A1 | 10/2015 | Chong et al. |
| 2018/0174245 A1 | 6/2018 | Law et al. |
| 2019/0362097 A1 | 11/2019 | Ho et al. |

FOREIGN PATENT DOCUMENTS

| | | |
|---|---|---|
| WO | 2009/025855 A1 | 2/2009 |
| WO | 2009/025856 A1 | 2/2009 |

OTHER PUBLICATIONS

Applicant Initiated Interview Summary Received for U.S. Appl. No. 14/709,687 dated Oct. 23, 2019, 3 pages.
Non-Final Office Action Received for U.S. Appl. No. 14/709,687, dated Aug. 19, 2019, 18 Pages.
Response to Non-Final Office Action filed on Oct. 25, 2019 for U.S. Appl. No. 14/709,687, dated Aug. 19, 2019, 10 pages.
Preliminary Amendment filed on Aug. 7, 2019 for U.S. Appl. No. 16/534,605, 6 pages.
Aho et al., "Directed Graphs", Date Structures and Algorithms, Chapter 6, Addison-Wesley Publishing Company, 1983, pp. 198-219.
Ebay, "The World's Online Marketplace", Retrieved from Internet URL: https://web-beta.archive.org/web/20070228151057/http://hub.ebay.com:80/buy, Feb.-Mar. 2007, 27 pages.
Response to Final Office Action filed on Aug. 28, 2017 for U.S. Appl. No. 13/341,978, dated Jun. 29, 2017, 17 pages.
Non-Final Office Action received for U.S. Appl No. 13/539,379, dated Dec. 12, 2014, 12 pages.
Response to Non-Final Office Action filed dated Apr. 13, 2015 for U.S. Appl. No. 13/539,379 dated Dec. 12, 2014, 15 pages.
Non-Final Office Action received for U.S. Appl. No. 13/783,583, dated Oct. 3, 2013, 12 pages.
Notice of Allowance received for U.S. Appl. No. 13/783,583, dated Jan. 22, 2015, 11 pages.
Notice of Non-Compliant Amendment received for U.S. Appl. No. 13/783,583, dated Sep. 8, 2014, 2 pages.
Response to Final Office Action filed on Sep. 3, 2014, for U.S. Appl. No. 13/783,583, dated Jun. 3, 2014, 10 pages.
Response to Non-Final Office Action filed on Jan. 3, 2014, for U.S. Appl. No. 13/783,583, dated Oct. 3, 2013, 11 pages.
Response to Notice of Non-Compliant Amendment filed on Sep. 22, 2014, for U.S. Appl. No. 13/783,583, dated Sep. 8, 2014, 10 pages.
Final Office Action received for U.S. Appl. No. 13/783,583, dated Jun. 3, 2014, 12 pages.
Non-Final Office Action received for U.S. Appl. No. 13/848,545, dated Jan. 3, 2014, 10 pages.
Non-Final Office Action received for U.S. Appl. No. 13/848,545, dated Sep. 8, 2014, 13 pages.
Notice of Non-Compliant received for U.S. Appl. No. 13/848,545, dated Jul. 14, 2014, 2 pages.
Preliminary Amendment received for U.S. Appl. No. 13/848,545, dated Mar. 22, 2013, 8 pages.
Response to Non-Final Office Action filed Apr. 2, 2014, for U.S. Appl. No. 13/848,545, dated Jan. 3, 2014, 11 pages.
Response to Notice of Non-Compliant Amendment filed on Aug. 14, 2014, for U.S. Appl. No. 13/848,545, dated Jul. 14, 2014, 12 pages.
Response to Restriction Requirement filed on Sep. 16, 2013, for U.S. Appl. No. 13/848,545, dated Aug. 14, 2013, 7 pages.
Restriction Requirement received for U.S. Appl. No. 13/848,545, dated Aug. 14, 2013, 5 pages.
Non-Final Office Action received for U.S. Appl. No. 13/858,495, dated Jun. 25, 2013, 9 pages.
Non-Final Office Action received for U.S. Appl. No. 13/858,495, dated Oct. 10, 2014, 6 pages.
Notice of Allowance received for U.S. Appl. No. 13/858,495, dated Jan. 27, 2015, 5 pages.
Notice of Allowance received for U.S. Appl. No. 13/858,495, dated Mar. 20, 2014, 11 pages.
Response to Non-Final Office Action filed on Jan. 12, 2015 for U.S. Appl. No. 13/858,495, dated Oct. 10, 2014, 18 pages.
Response to Non-Final Office Action filed on Sep. 6, 2013 for U.S. Appl. No. 13/858,495, dated Jun. 25, 2013, 10 pages.
Examiner Initiated Interview Summary Received for U.S. Appl. No. 13/975,132, dated Feb. 20, 2015, 3 pages.
Non-Final Office Action received for U.S. Appl. No. 13/975,132, dated May 16, 2014, 18 pages.
Non-Final Office Action received for U.S. Appl. No. 13/975,132, dated Oct. 9, 2014, 15 pages.
Notice of Allowance received for U.S. Appl. No. 13/975,132, dated Mar. 20, 2015, 15 pages.
Preliminary Amendment filed for U.S. Appl. No. 13/975,132, dated Nov. 14, 2013, 7 pages.
Response to Non-Final Office Action filed on Feb. 9, 2015 for U.S. Appl. No. 13/975,132, dated Oct. 9, 2014, 22 pages.
Response to Non-Final Office Action filed on Sep. 16, 2014 for U.S. Appl. No. 13/975,132, dated May 16, 2014, 12 pages.
Preliminary Amendment for U.S. Appl. No. 14/709,687, filed Jun. 26, 2018, 6 pages.
Preliminary Amendment received for U.S. Appl. No. 14/709,687 filed May 24, 2015, 7 pages.
Response to Restriction Requirement filed on Sep. 26, 2018, for U.S. Appl. No. 14/709,687, dated Aug. 13, 2018, 6 pages.
Restriction Requirement Received received for U.S. Appl. No. 14/709,687, dated Aug. 13, 2018, 6 pages.
Non-Final Office Action received for U.S. Appl. No. 14/720,814, dated May 19, 2017, 20 pages.
Notice of Allowance received for U.S. Appl. No. 14/720,814, dated Oct. 2, 2017, 7 pages.
Preliminary Amendment received for U.S. Appl. No. 14/720,814, filed May 27, 2015, 8 pages.
Response to Non-Final Office Action filed on Aug. 21, 2017 for U.S. Appl. No. 14/720,814, dated May 19, 2017, 21 pages.
Preliminary Amendment filed for U.S. Appl. No. 14/795,765, dated Jul. 21, 2015, 8 pages.
Aho, "Data Structures and Algorithms: Chapter 3 Trees", Addison-Wesley Publishing Company, Menlo Park, California, 1983, 75-89.
Alberto, "Reputation Managers are Happening", Useit.core, Alertbox, Sep. 5, 1999, 4 pages.
audioreview.com, "NAD 412 Reviews, Found on WayBackMachine", Retrieved from the Internet: <URL:http://web.archive.org/web/19990203004345/www.audioreview.com/reviews/Turner/nad_412 Jumer.shtml>, Feb. 3, 1995, 9 pages.
beyond.com, "IMS Web Spinner Personal V1.26 for Win95/98/NT", Retrieved from the Internet:< URL:http://web.archive.org/web/20000125152017/www.beyond.com/PKSN104373/prod.htmcrewiew>, 1998-2000, 3 pages.
Broida, "Secrets of Online Power Shopping:—E-Tailers Offercool Tools to Help you Shop Better, Smarter, and more often", Computer Shopper, v 21, e 11, downloaded from Dialog Web, Mar. 21, 2011, 7 pages.
Chicago Tribune, "Amazon.com Expands into toys, electronics", Chicago Tribune, Jul. 14, 1999, 3 pages.
Consumer Review!, "49,000 Product Reviews by Consumers for Consumers",Retrieved from the Internet: URL: <http: web.archive.org web 19981206010249 http:www.consumerreview.com>, (1996-1998), 22 pages.
epinions.com, "Epinions.com",Retrieved from the Internet URL:< http://web.archive.org/web/19991129024603/www.epinions.com/>, 1999, 35 pages.
Festa, "Have an Epinion?", CNET News.com, Online Article, Jul. 9, 1999, 2 pages.
Guglielmo, "BizRate Lets Consumers Rate Sites", Interactive Week, Aug. 4, 1997, 4 pages.
Ex Parte Quayle Action Received for U.S. Appl. No. 14/709,687, dated Mar. 21, 2019, 11 pages.
Notice of Allowance received for U.S. Appl. No. 14/709,687, dated May 20, 2019, 11 pages.
Response to Ex Parte Quayle Action filed on Apr. 10, 2019, for U.S. Appl. No. 14/709,687, dated Mar. 21, 2019, 3 pages.

(56) References Cited

OTHER PUBLICATIONS

Response to Non-Final Office Action filed on Oct. 8, 2018, for U.S. Appl. No. 15/865,894, dated Jul. 6, 2018, 27 pages.
Notice of Allowance received for U.S. Appl. No. 15/865,894, dated Feb. 7, 2019, 7 pages.
Preliminary Amendment filed on Mar. 7, 2018 for U.S. Appl. No. 15/865,894, 7 pages.
kaboodle.com "Internet Archive Wayback Machine", Retrieved from the Internet URL: <Internet www.kaboddle.com> Aug. 21, 2007, 10 pages.
Non-Final Office Action received for U.S. Appl. No. 15/865,894, dated Jul. 6, 2018, 13 pages.
PTO Response to Amendment under Rule 312 for U.S. Appl. No. 13/525,098, dated Sep. 11, 2013, 2 pages.
Final Office Action Received for U.S. Appl. No. 14/709,687, dated Feb. 4, 2020, 23 pages.
"MTB Review",, Archived [Jan. 25, 1997] Retrieved from the Internet: URL: <http: web.archive.org/web19970125123339 http: www.mtbr.com>, Jan. 27, 2005, 9 pages.
"Kabodle.com: Get Started with Kaboodle", Retrieved from the Internet: URL:<http://www.shmula.com/230/12-questions-with-kaboodle>, Aug. 13, 2006, 10 pages.
"BuyClearance.com—The Internet Clearance Superstore: Product Information", [Online], Retrieved from the Internet<URL: http: web.archive.org/web/20000124120021/www.buy.com/clearance/productasp?sku=70000254>, Aug. 29, 2003, 1 page.
"eBay: Company Overview", Retrieved from the Internet<URL: http://web.archive.org/web/20040407121828/www.bay.com/Homepage/com pany overview>, 2004, 2 pages.
"FAQ section of kaboodle.com", Retrieved from the Internet<URL: http: web.archive.org web 20060813110112 http: www.kaboodle.con zd help faq.html>, Aug. 13, 2006, 7 pages.
"12 Questions with Kaboodle", [Online]. Retrieved from the Internet<URL: http: www.shmula.com 230 12-questions-with-kaboodle>, Oct. 23, 2006, 7 pages.
"Kaboodle Delivers eBay's New "My Collectibles" Destination" Retrieved from the Internet:<URL: http: www.kaboodle.com zm pr3>, Jun. 12, 2006, 2 pages.
"The archived step-by-step Guide to Using Kaboodle section of the Kaboodle" Retrieved from the Internet:<URL: http:web.archive.org web 20051125044141 www.kaboodle.eom zd help.about.earnhow.html>, Aug. 19, 2009, 5 pages.
Appeal Brief filed for U.S. Appl. No. 10/958,197, filed Aug. 29, 2014, 23 pages.
Advisory Action received for U.S. Appl. No. 10/968,197, dated Jun. 5, 2014, 3 pages.
Decision on Pre-Appeal Brief Request received for U.S. Appl. No. 10/968,197, dated Jul. 31, 2014, 2 pages.
Examiner's Answer to Appeal Brief filed for U.S. Appl. No. 10/968,197, dated Dec. 23, 2014, 28 pages.
Final Office Action received for U.S. Appl. No. 10/968,197, dated Mar. 26, 2014, 25 pages.
Final Office Action received for U.S. Appl. No. 10/968,197, dated May 12, 2010, 16 pages.
Non-Final Office Action received for U.S. Appl. No. 10/968,197, dated Sep. 10, 2013, 19 pages.
Non-Final Office Action received for U.S. Appl. No. 10/968,197 dated Oct. 16, 2009, 17 pages.
Pre-Appeal Brief Request filed on Jun. 19, 2014, for U.S. Appl. No. 10/968,197, 5 pages.
Response to Final Office Action filed on May 27, 2014, for U.S. Appl. No. 10/968,197, dated Mar. 26, 2014, 17 pages.
Response to Final Office Action filed on Sep. 13, 2010, for U.S. Appl. No. 10/968,197, dated May 12, 2010, 19 pages.
Response to Non-Final Office Action filed on Jan. 10, 2014, for U.S. Appl. No. 10/968,197, dated Sep. 10, 2013, 15 pages.
Response to Non-Final Office Action filed on Jan. 19, 2010, for U.S. Appl. No. 10/968,197, dated Oct. 16, 2009, 15 pages.
Notice of Allowance received for Korean Patent Application No. 10-2010-7006376, dated May 30, 2012, 3 pages.
Office Action received for Korean Patent Application No. 10-2010-7006376 dated Oct. 14, 2011, 8 pages.
Response to Office Action filed on Dec. 14, 2011 for Korean Patent Application No. 10-2010-7006376, dated Oct. 14, 2011, 32 pages.
Final Office Action received for U.S. Appl. No. 11/278,113, dated Dec. 6, 2010, 15 pages.
Non-Final Office Action received for U.S. Appl. No. 11/278,113, dated Apr. 1, 2010, 13 pages.
Notice of Allowance received for U.S. Appl. No. 11/278,113, dated Mar. 25, 2011, 11 pages.
Response to Final Office Action filed on Mar. 7, 2011, for U.S. Appl. No. 11/278,113, dated Dec. 6, 2010, 15 pages.
Response to Non-Final Office Action filed on Jul. 1, 2010, for U.S. Appl. No. 11/278,113, dated Apr. 1, 2010, 14 pages.
Final Office Action received for U.S. Appl. No. 11/963,399, dated Aug. 24, 2009, 25 pages.
Non-Final Office Action received for U.S. Appl. No. 11/963,399, dated Mar. 3, 2009, 15 pages.
Notice of Allowance received for U.S. Appl. No. 11/963,399, dated Jan. 6, 2010, 16 pages.
Response to Final Office Action filed on Oct. 27, 2009, for U.S. Appl. No. 11/963,399, dated Aug. 24, 2009, 10 pages.
Response to Non-Final Office Action filed on Jun. 3, 2009 for U.S. Appl. No. 11/963,399, dated Mar. 3, 2009, 18 pages.
Examiner Interview Summary received for U.S. Appl. No. 11/963,426, dated Nov. 25, 2009, 3 pages.
Final Office Action received for U.S. Appl. No. 11/963,426, dated May 13, 2010, 15 pages.
Non-Final Office Action received for U.S. Appl. No. 11/963,426, dated Aug. 27, 2009, 26 pages.
Non-Final Office Action received for U.S. Appl. No. 11/963,426, dated Mar. 3, 2009, 15 pages.
Notice of Allowance received for U.S. Appl. No. 11/963,426, dated Nov. 15, 2010, 16 pages.
Preliminary Amendment filed for U.S. Appl. No. 11/963,426, dated Mar. 21, 2008, 3 pages.
Response to Final Office Action filed on Oct. 13, 2010, for U.S. Appl. No. 11/963,426, dated May 13, 2010, 10 pages.
Response to Non-Final Office Action filed on Jun. 3, 2009 for U.S. Appl. No. 11/963,426, dated Mar. 3, 2009, 13 pages.
Response to Non-Final Office Action filed on Nov. 25, 2009 for U.S. Appl. No. 11/963,426, dated Aug. 27, 2009, 10 pages.
Supplemental Notice of Allowability received for U.S. Appl. No. 11/963,426, dated Apr. 22, 2011, 4 pages.
Advisory Action received for U.S. Appl. No. 12/104,270 dated Aug. 9, 2010, 3 pages.
Final Office Action received for U.S. Appl. No. 12/104,270, dated Jun. 1, 2010, 11 pages.
Final Office Action received for U.S. Appl. No. 12/104,270, dated Mar. 30, 2011, 12 pages.
Non-Final Office Action received for U.S. Appl. No. 12/104,270, dated Dec. 16, 2010, 13 pages.
Non-Final Office Action received for U.S. Appl. No. 12/104,270, dated Jan. 29, 2010, 12 pages.
Notice of Allowance received for U.S. Appl. No. 12/104,270, dated Dec. 31, 2012, 7 pages.
Response to Non-Final Office Action filed on Dec. 28, 2015 for U.S. Appl. No. 13/341,978, dated Jul. 24, 2015, 18 pages.
Notice of Allowance received for U.S. Appl. No. 12/104,270, dated Mar. 7, 2012, 9 pages.
Preliminary Amendment filed for U.S. Appl. No. 12/104,270, dated Jun. 19, 2012, 9 pages.
Response to Final Office Action filed on Aug. 2, 2010 for U.S. Appl. No. 12/104,270 dated Jun. 1, 2010, 14 pages.
Response to Final Office Action filed on May 27, 2011, for U.S. Appl. No. 12/104,270 dated Mar. 30, 2011, 14 pages.
Response to Non-Final Office Action filed on Apr. 29, 2010 for U.S. Appl. No. 12/104,270, dated Jan. 29, 2010, 13 pages.
Response to Non-Final Office Action filed on Mar. 16, 2011 for U.S. Appl. No. 12/104,270, dated Dec. 16, 2010, 14 pages.
Supplemental Second Preliminary Amendment filed for U.S. Appl. No. 12/104,270, dated Aug. 21, 2012, 2 pages.

(56) References Cited

OTHER PUBLICATIONS

Examiner Initiated Interview Summary received for U.S. Appl. No. 12/767,666, dated Jun. 13, 2011, 2 pages.
Non-Final Office Action received for U.S. Appl. No. 12/767,666, dated Dec. 8, 2010, 10 pages.
Notice of Allowance received for U.S. Appl. No. 12/767,666, dated Jun. 13, 2011, 14 pages.
Response to Non-Final Office Action filed on Mar. 8, 2011 for U.S. Appl. No. 12/767,666, dated Dec. 8, 2010, 11 pages.
Final Office Action received for U.S. Appl. No. 13/033,354, dated May 24, 2012, 17 pages.
Non-Final Office Action received for U.S. Appl. No. 13/033,354, dated Dec. 7, 2011, 13 pages.
Notice of Allowance received for U.S. Appl. No. 13/033,354, dated Dec. 11, 2012, 8 pages.
Response to Final Office Action filed on Oct. 24, 2012, for U.S. Appl. No. 13/033,354 dated May 24, 2012, 12 pages.
Response to Non-Final Office Action filed on Feb. 24, 2012 for U.S. Appl. No. 13/033,354, dated Dec. 7, 2011, 10 pages.
Supplemental Notice of Allowability received for U.S. Appl. No. 13/033,354, dated Jan. 15, 2013, 3 pages.
Final Office Action received for U.S. Appl. No. 13/177,336, dated Jun. 21, 2012, 12 pages.
Non-Final Office Action received for U.S. Appl. No. 13/177,336, dated Jan. 19, 2012, 13 pages.
Notice of Allowance received for U.S. Appl. No. 13/177,336, dated Oct. 3, 2012, 8 pages.
Response to Final Office Action filed on Aug. 23, 2012, for U.S. Appl. No. 13/177,336, dated Jun. 21, 2012, 12 pages.
Response to Non-Final Office Action filed on Apr. 13, 2012, for U.S. Appl. No. 13/177,336, dated Jan. 19, 2012, 9 pages.
Applicant Initiated Interview Summary received for U.S. Appl. No. 13/177,341, dated Sep. 20, 2012, 2 pages.
Final Office Action received for U.S. Appl. No. 13/177,341, dated May 18, 2012, 14 pages.
Non-Final Office Action received for U.S. Appl. No. 13/177,341, dated Jan. 12, 2012, 13 pages.
Notice of Allowance received for U.S. Appl. No. 13/177,341, dated Oct. 9, 2012, 11 pages.
Response to Final Office Action filed on Aug. 20, 2012, for U.S. Appl. No. 13/177,341, dated May 18, 2012, 11 pages.
Response to Non-Final Office Action filed on Apr. 12, 2012, for U.S. Appl. No. 13/177,341, dated Jan. 12, 2012, 10 pages.
Examiner Interview Summary received for U.S. Appl. No. 13/192,100, dated Oct. 25, 2013, 3 pages.
Non-Final Office Action received for U.S. Appl. No. 13/192,100, dated Aug. 7, 2013, 13 pages.
Notice of Allowance received for U.S. Appl. No. 13/192,100, dated Nov. 18, 2013, 11 pages.
Response to Non Final Office Action filed on Nov. 6, 2013, for U.S. Appl. No. 13/192,100, dated Aug. 7, 2013, 15 pages.
Advisory action received for U.S. Appl. No. 13/341,978 dated Feb. 19, 2016, 3 pages.
Applicant Initiated Interview Summary received for U.S. Appl. No. 13/341,978, dated Mar. 15, 2017, 3 pages.
Final Office Action received for U.S. Appl. No. 13/341,978, dated Jun. 29, 2017, 17 pages.
Final Office Action received for U.S. Appl. No. 13/341,978, dated Jul. 24, 2015, 19 pages.
Non-Final Office Action received for U.S. Appl. No. 13/341,978, dated Dec. 29, 2014, 15 pages.
Non-Final Office Action received for U.S. Appl. No. 13/341,978, dated Feb. 8, 2017, 20 pages.
Non-Final Office Action received for U.S. Appl. No. 13/341,978, dated Jun. 30, 2014, 12 pages.
Response to Non-Final Office Action filed on Apr. 29, 2015 for U.S. Appl. No. 13/341,978, dated Dec. 29, 2014, 31 pages.
Response to Non-Final Office Action filed on May 8, 2017, for U.S. Appl. No. 13/341,978, dated Feb. 8, 2017, 17 pages.
Response to Non-Final Office Action filed on Sep. 30, 2014 for U.S. Appl. No. 13/341,978, dated Jun. 30, 2014, 13 pages.
312 Amendment for U.S. Appl. No. 13/525,098, filed Aug. 30, 2013, 7 pages.
Final Office Action received for U.S. Appl. No. 13/525,098, dated Feb. 21, 2013, 7 pages.
Non-Final Office Action received for U.S. Appl. No. 13/525,098, dated Oct. 29, 2012, 10 pages.
Notice of Allowance received for U.S. Appl. No. 13/525,098, dated May 30, 2013, 10 pages.
Response to Final Office Action filed on Apr. 22, 2013, for U.S. Appl. No. 13/525,098, dated Feb. 21, 2013, 10 pages.
Response to Non-Final Office Action filed on Jan. 29, 2013 for U.S. Appl. No. 13/525,098, dated Oct. 29, 2012, 10 pages.
Applicant Initiated Interview Summary received for U.S. Appl. No. 13/341,978 dated Aug. 17, 2017, 3 pages.
Halpern, "In Your Face", Marketing 112, 13, Jul. 16, 2007, pp. 45-47.
Kornblum, "Consumer Reports an Online Win", CNET News.com, Online Article, Retrieved from the Internet: URL: <http: news.com.com 2100-1023-217386.html>, Nov. 2, 1998, 2 pages.
Krigel, "Big changes ahead for Deja News", CNET News.com, Online Article, Retrieved from the Internet: URL: <http: news.com.com 2100-1023-225101.html>, Apr. 28, 1999, 3 pages.
Mason, "Doing it for yourself: Dance Music Summit focuses on Independence, Selfreliance for Artists, Labels", BeatBox, Billboard, vol. 117, No. 42, Oct. 15, 2005, 2 pages.
Miller, "The Best Products of 1999 Revealed", ZDNet, Retrieved from the Internet: URL:< http: www.zdnet.com anchordesk stories story 0,10738,5019537,00.html>, Dec. 13, 1999, 2 pages.
Newby, "Facebook, Politico to Measure Sentiment of GOP Candidates by Collecting Posts", 2006-2012 Clarity Digital Group LLC d/b/a Examiner.com, Jun. 28, 2012, 3 pages.
Patience, "Epinons Launches Online Shopping Guide Built on Trust", Computergram International, 3744, Sep. 10, 1999, 2 pages.
International Preliminary Report on Patentability received for PCT Application No. PCT/US2008/010003, dated Mar. 4, 2010, 7 pages.
International Search Report received for PCT Application No. PCT/US2008/010003, dated Nov. 12, 2008, 4 pages.
International Written Opinion received for PCT Application No. PCT/US2008/010003 dated Nov. 12, 2008, 4 pages.
International Preliminary Report on Patentability received for PCT Application No. PCT/US2008/010004, dated Mar. 4, 2010, 8 pages.
International Search Report received for PCT Application No. PCT/US2008/010004, dated Nov. 10, 2008, 5 pages.
International Written Opinion received for PCT Application No. PCT/US2008/010004 dated Nov. 10, 2008, 5 pages.
Politicology, "Facebook Gives POLITICO Access to Your Political Beliefs", Ology, Retrieved from the Internet: URL: <http://www.ology.com/post/51413/facebook-gives-politico-access-to-your-political-beliefs>, Accessed on Jun. 28, 2012, 4 pages.
pricescan.com, "PriceSCAN: Your Unbiased Guide to the Lowest Prices on Books, Computers, Electronic", Retrieved from the Internet: URL: < http://web.archive.org/web/19991117123352/www.pricescan.com>, 1997-99, 1 page.
Product ReviewNet!, "Welcome to Product ReviewNet! The Premier Online Source for Product Review Abstracts", Retrieved from the Internet: URL:<http://web.archive.org/web/19981201205356/www.productreview.net.com/splash.html>, 1996-1998, 1 page.
Proquest, "Buy.com, Facebook team up to compete with eBay", The A.P., Charleston Daily Mail, Retrieved from Proquest Sep. 21, 2012, Aug. 7, 2007, 1 page.
Sabater, "Regret: A Reputation Model for Gregarious Societies", IIIA—Artificial Intelligence Research Institute, CSIC Retrieved from the Internet: URL:<http: citeseerxist.psu.edu viewdoc download doi=10.1.1.88.797andrep=rep1andtype=pdf>, 1999, 9 pages.
Sifry, "Politico-Facebook Sentiment Analysis Will Generate "Bogus" Results, Expert Says", Retrieved from the Internet: URL: <http://techpresident.com/news/21618/politico-facebook-sentiment-analysis-bogus>, Jan. 13, 2012, 4 pages.
Vendelo, "Narrating Corporate Reputation: Becoming Legitimate Through Storytelling", International Studies of Management & Organization v28n3, Fall 1998, pp. 120-137.

(56) References Cited

OTHER PUBLICATIONS

Wolverton, "Productopia Launches Product Review Site", CNET News.com, Retrieved from the Internet: URL: (http: news.com.com2100-1017-228811.htm>, Jul. 21, 1999, 2 pages.
Advisory action received for U.S. Appl. No. 13/341,978 dated Sep. 22, 2017, 3 pages.
Response to Notice of Non-Compliant Amendment filed on Sep. 12, 2014, for U.S. Appl. No. 13/783,583, dated Sep. 8, 2014, 10 pages.
Examiner Interview Summary received for U.S. Appl. No. 13/845,545, dated Oct. 31, 2014, 3 pages.
Zacharia "Collaborative Reputation Mechanisms in Electronic Marketplaces", Proceedings of the 32nd Hawaii International Conference on System Sciences, 1999, pp. 1-7.
Aho "Data Structures and Algorithms: Chapter 3 Trees", Addison-Wesley Publishing Company, Menlo Park, California, 1983, pp. 75-89.
Non-Final Office Action received for U.S. Appl. No. 16/534,605, dated Oct. 1, 2020, 22 pages.
Non Final Office Action Received for U.S. Appl. No. 14/709,687 dated Jul. 22, 2020, 26 Pages.
Response to Final Office Action filed Jul. 6, 2020 for U.S. Appl. No. 14/709,687, dated Feb. 4, 2020, 10 Pages.
Notice of Allowance received for U.S. Appl. No. 14/709,687, dated Dec. 10, 2020, 9 Pages.
Response to Non-Final Office Action filed Nov. 23, 2020 for U.S. Appl. No. 14/709,687 dated Jul. 22, 2020, 10 pages.
Applicant Initiated Interview Summary received for U.S. Appl. No. 16/534,605, dated Dec. 14, 2020, 3 Pages.
Notice of Allowance Received for U.S. Appl. No. 16/534,605, dated Mar. 31, 2021, 8 Pages.

VIEWING SHOPPING INFORMATION ON A NETWORK BASED SOCIAL PLATFORM

RELATED APPLICATIONS

This application is a continuation of U.S. application Ser. No. 15/865,894, filed Jan. 9, 2018, issued as U.S. Pat. No. 10,339,613, which is a continuation of U.S. application Ser. No. 14/720,814, filed May 24, 2015, issued as U.S. Pat. No. 9,892,471, which is a continuation of U.S. application Ser. No. 13/858,495, filed Apr. 8, 2013, issued as U.S. Pat. No. 9,043,227, which is a continuation of U.S. application Ser. No. 13/033,354, filed Feb. 23, 2011, issued as U.S. Pat. No. 8,417,577, which is a continuation of U.S. application Ser. No. 11/963,426, filed on Dec. 21, 2007, issued as U.S. Pat. No. 7,945,482, which claims the benefit of U.S. Provisional Application No. 60/957,645, filed Aug. 23, 2007, each of which is incorporated by reference herein in its entirety.

FIELD

Embodiments relate generally to the technical field of data communications and, in one example embodiment, to communications over a network.

BACKGROUND

Applications available on the Internet have progressed from facilitating a medium of information delivery to a venue for sales and more recently to a platform for social networking. Online market places such as Amazon.com and eBay.com are examples of online sellers. Similarly, mySpace.com and Facebook.com are examples of social networking.

BRIEF DESCRIPTION OF DRAWINGS

The present disclosure is illustrated by way of example and not limitation in the figures of the accompanying drawings, in which like references indicate similar elements and in which.

DETAILED DESCRIPTION

In the following description, for purposes of explanation, numerous specific details are set forth in order to provide a thorough understanding of an embodiment of the present disclosure. It will be evident, however, to one skilled in the art that the present disclosure may be practiced without these specific details.

In some example embodiments, a system and method for viewing shopping information on a network-based social platform is illustrated. At a network-based social platform, a request may be received from a first user of the network-based social platform to view a list associated with a second user on the network-based social platform. The list may include one or more items and facilitate watching the items in real time on the network-based social platform to monitor the progress of an auction or an immediate purchase of the item on the network-based marketplace. For example, the list may include items for which a bid has been submitted by the second user in respective auctions on the network-based marketplace 12. Next, the system may determine whether the first user is authorized to view the list associated with the second user based on a predetermined relationship between the first and second user. For example, the predetermined relationship may have been consensually established by the first and second users on the network-based social platform and may, in some embodiments, include the relationship "friend" or "favorite friend." Further, the second user may configure a level disclosure preventing display of specific items on requested list or specific information of items on the list. Finally, the system may communicate the list of items to the first user based on the configured level of disclosure. Accordingly, in some embodiments, a first user on a network-based social platform may view shopping information concerning an item on a network-based marketplace that is being monitored on a list by a second user on the network-based social platform.

Platform Architecture

Figure 1:
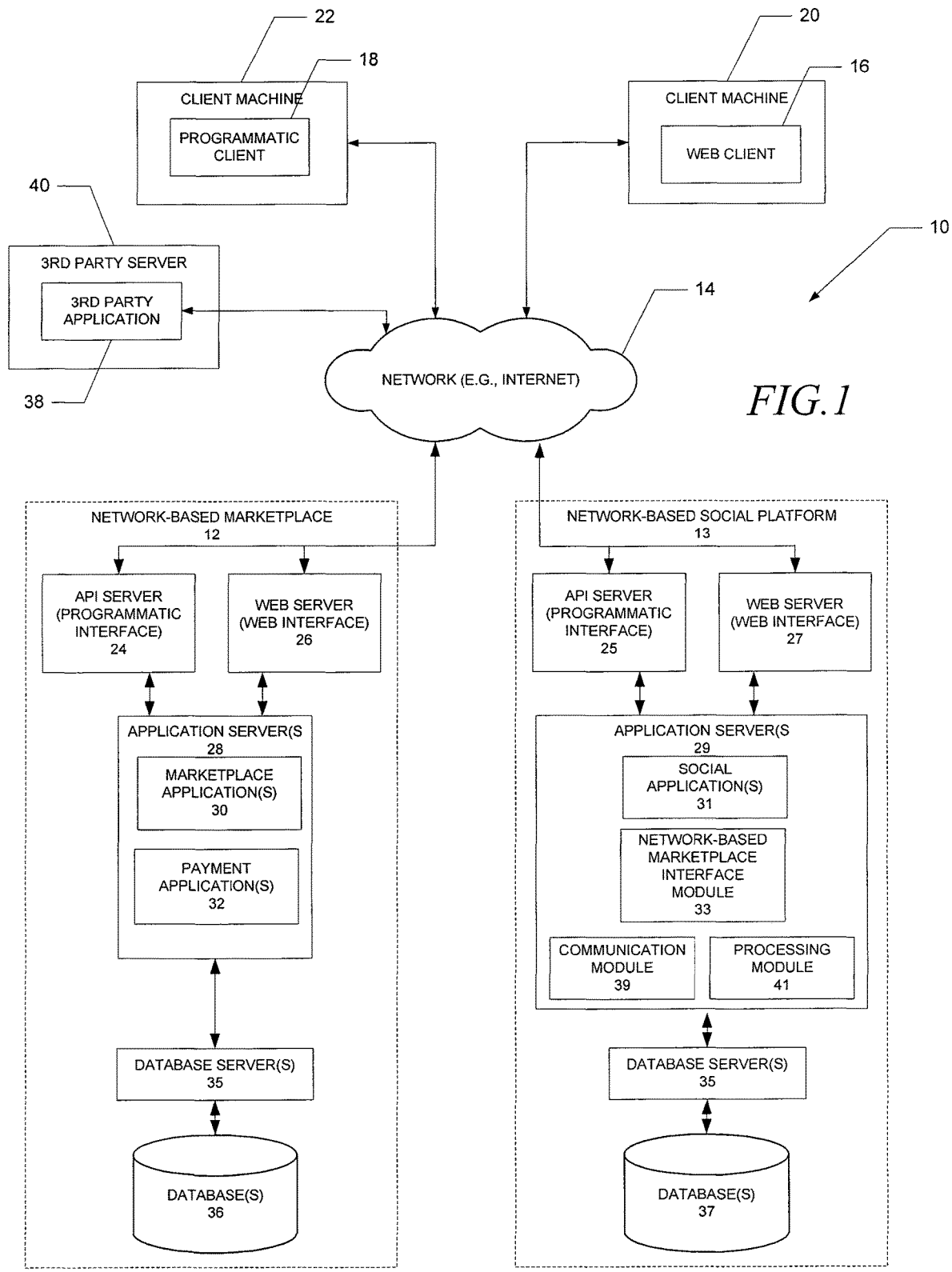
FIG. 1 is a network diagram depicting a system, according to one example embodiment, having a client-server architecture.

FIG. 1 is a network diagram depicting a system 10, according to one embodiment of the present disclosure, having a client-server and a peer-to peer architecture. The system 10 facilitates shopping activity, in the exemplary form of a network-based marketplace 12, and a network-based social platform 13 that communicate over a network 14. In one embodiment, the network-based marketplace 12 and the network-based social platform 13 communicate in peer-to peer architecture via programmatic interfaces. Further, the network-based marketplace 12 and the network-based social platform 13 respectively communicate in client-server architecture with clients. The network-based marketplace 12, provides server-side functionality, via the network 14 (e.g., the Internet), to the one or more client machines 20 and 22. Similarly, the network-based social platform 13 provides server-side functionality, via the network 14 (e.g., the Internet), to the one or more client machines 20 and 22. FIG. 1 illustrates, for example, a web client 16 (e.g., a browser, such as the Internet Explorer browser developed by Microsoft Corporation of Redmond, Wash. State), and a programmatic client 18 executing on respective client machines 20 and 22.

Turning specifically to the network-based social platform 13, an application program interface (API) server 25 and a web server 27 are coupled to, and provide programmatic and web interfaces respectively to, one or more application servers 29. The application servers 29 may host one or more social applications 31 and a network-based marketplace interface module 33 that communicates with a communication module 39 and a processing module 41. The application servers 28 are, in turn, shown to be coupled to one or more databases servers 35 that facilitate access to one or more databases 37.

The social applications 31 provide a number of social networking functions and services to users that access the network-based social platform 13. For example, the social applications 31 may enable a user to store information in a profile that may be viewed at the client machines 20, 22 and to selectively grant access to information that appears on the profile to other users who may also view the profile at their client machines 20, 22, The social applications 31 may provide criteria that may be employed by a user to grant various levels of access to various levels of users. For example, a first user may access profile information associated with a second user responsive to the first user achieving the status of "friend" in relation to a second user. A user may achieve the status of friend by accepting an invitation from another user or by sending a request to a user that subsequently grants the request.

The social applications 31 may further enable third party service providers to add "applications" on the network-based social platform 13 that are utilized by users to interact with other users. For example, a network-based marketplace application may be added by a third party service provider in the form of the network-based marketplace interface module 33, the communication module 39, and the processing module 41 that may provide market application services in the network-based social platform 13 environment and may communicate with the network-based marketplace 12.

In one embodiment, a request related to the marketplace application may be generally processed as follows. The request may originate at the client machines 20, 22 that communicates the request via programmatic or web interface services 25, 27 to the social applications 31 that, in turn, communicate the request to the network-based marketplace interface module 33 that, in turn, communicates the request to the communication module 39 and processing module 41 that process the request. Conversely, the communication module 39 and processing module 41 may respond to the social applications 31 via the network-based marketplace interface module 33. In some instances processing of the request may require communication with the network-based marketplace 12. In such instances the communication module 41 may communicate via the API interface 25 with the network-based marketplace 12.

The network-based social platform 13 may be embodied as FACEBOOK® services, a social utility that connects people with friends and others who work, study and live around them provided by Facebook of Palo Alto, Calif.

The web client 16, it will be appreciated, accesses the various social applications 31 via the web interface supported by the web server 27. Similarly, the programmatic client 18 accesses the various services and functions provided by the social applications 31 via the programmatic interface provided by the API server 25.

Turning to the network-based marketplace 12, an application program interface (API) server 24 and a web server 26 are coupled to, and provide programmatic and web interfaces respectively to, one or more application servers 28. The application servers 28 host one or more marketplace applications 30 and payment applications 32. The application servers 28 are, in turn, shown to be coupled to one or more databases servers 34 that facilitate access to one or more databases 36.

The marketplace applications 30 provide a number of marketplace functions and services to users that access the marketplace 12. The payment applications 32 likewise provide a number of payment services and functions to users. The payment applications 32 may allow users to quantify for, and accumulate, value (e.g., in a commercial currency, such as the U.S. dollar, or a proprietary currency, such as "points") in accounts, and then later to redeem the accumulated value for products (e.g., goods or services) that are made available via the marketplace applications 30. While the marketplace and payment applications 30 and 32 are shown in FIG. 1 to both form part of the network-based marketplace 12, it will be appreciated that, in alternative embodiments of the present disclosure, the payment applications 32 may form part of a payment service that is separate and distinct from the marketplace 12. The network-based marketplace 12 may be embodied as eBAY, the worlds online marketplace, provided by eBay of San Jose, Calif.

Further, while the system 10 shown in FIG. 1 employs a client-server architecture and a peer-to-peer architecture, the present disclosure is of course not limited to such an architecture, and could equally well find application in any combination of client-server, distributed, or peer-to-peer, architecture systems. The various marketplace and payment applications 30 and 32 could also be implemented as stand-alone software programs, which do not necessarily have networking capabilities.

The web client 16, it will be appreciated, accesses the various marketplace and payment applications 30 and 32 via the web interface supported by the web server 26. Similarly, the programmatic client 18 accesses the various services and functions provided by the marketplace and payment applications 30 and 32 via the programmatic interface provided by the API server 24. The programmatic client 18 may, for example, be a seller application (e.g., the TurboLister application developed by eBay Inc., of San Jose, Calif.) to enable sellers to author and manage listings of items on the marketplace 12 in an off-line manner, and to perform batch-mode communications between the programmatic client 18 and the network-based marketplace 12.

It will be appreciated that the marketplace applications 30, payment applications 32, social applications 31, the network-based marketplace interface module 33, the communication module 39 and the processing module 41 may execute on a single platform. Accordingly, in one embodiment, the aforementioned applications/modules may execute on the network-based marketplace 12 and in another embodiment the aforementioned applications/module may execute on the network-based social platform 13.

FIG. 1 also illustrates a third party application 38, executing on a third party server machine 40, as having programmatic access to the network-based marketplace 12 via the programmatic interface provided by the API server 24. For example, the third party application 38 may, utilizing information retrieved from the network-based marketplace 12, support one or more features or functions on a website hosted by the third party. The third party website may, for example, provide one or more promotional, marketplace or payment functions that are supported by the relevant applications of the network-based marketplace 12.

Social Platform Applications

Figure 2:
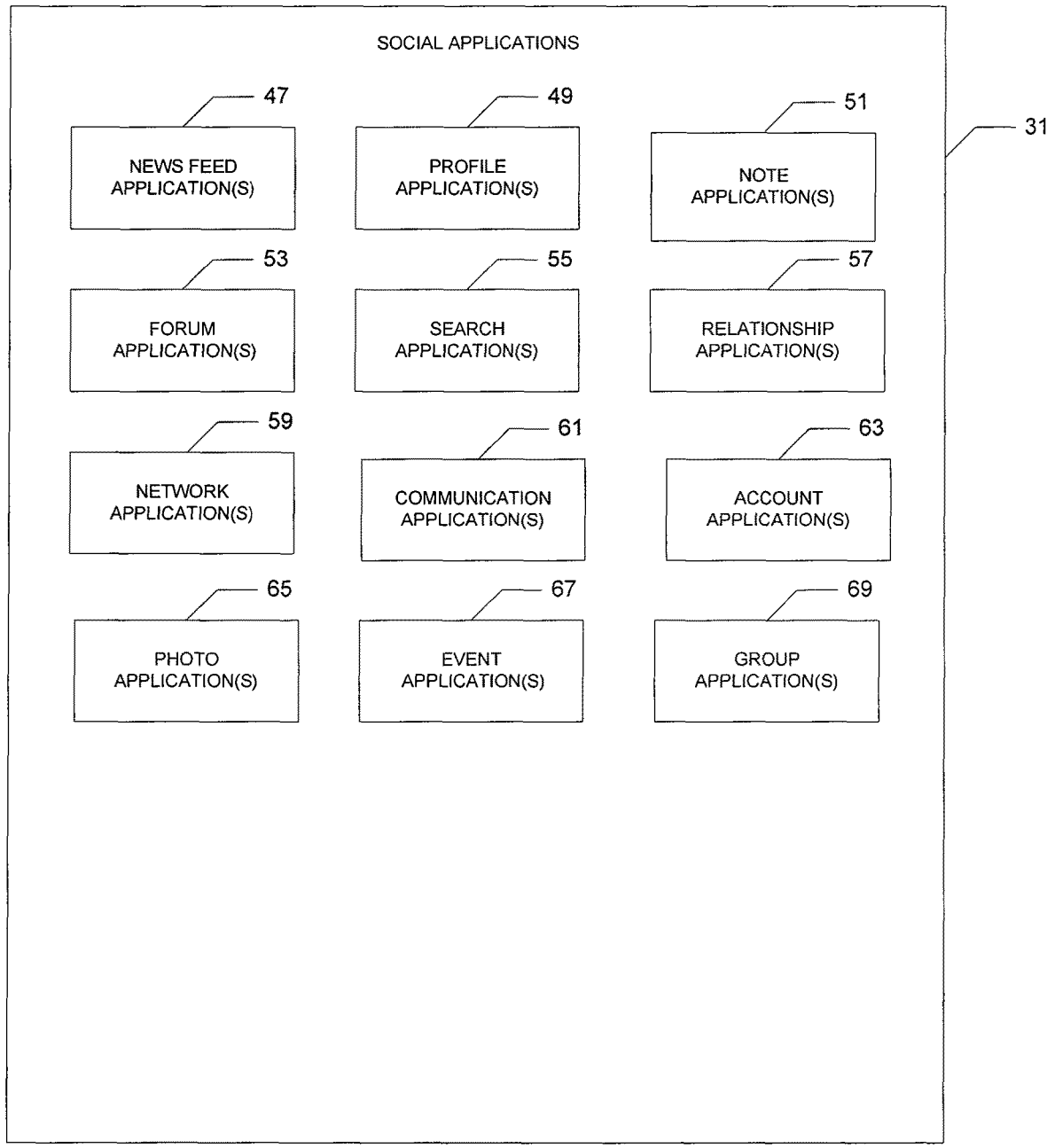
FIG. 2 is a block diagram illustrating social applications, according to an embodiment.

FIG. 2 is a block diagram illustrating social applications 31 that execute on the network-based social platform 13, according to an embodiment. The social applications 31 include news feed applications 47, profile applications 49, note applications 51, forum applications 53, search applications 55, relationship applications 57, network applications 59, communication applications 61, account applications 63, photo applications 65, event applications 67 and group applications 69.

The news feed applications 47 publish events associated with the user and friends of the user on the network-based social platform 13. The news feed applications 47 may publish the events on the user profile of a user. For example, the news feed applications 47 may publish the uploading of a photo album by one user on the user profile the user and the user profiles of friends of the user.

The profile applications 49 may maintain user profiles for each of the users on the network-based social platform 13. Further, the profile applications 49 may enable a user to restrict access to selected parts of their profile to prevent viewing by other users. The notes applications 51 may be used to author notes that may be published on various user interfaces.

The forum applications 53 may maintain a forum for users to post comments and display the forum via the profile associated with a user. The user may add comments to the forum, remove comments from the forum and restrict visibility to other users. In addition, other users may post comments to the forum. The search applications 55 may enable a user to perform a keyword search for users, groups, and events. In addition, the search applications 55 may enable a user to search for content (e.g. favorite movies) on profiles accessible to the user.

The relationship applications 57 may maintain relationship information for the users. The network applications 59 may facilitate the addition of social networks by a user, the social networks based on a school, workplace, or region or any social construct for which the user may prove an affiliation. The communication applications 61 may process incoming and outgoing messages, maintain an inbox for each user, facilitate sharing of content, facilitate interaction among friends (e.g., poking), process requests, process events, process group invitations and process communicating notifications.

The account applications 63 may provide services to facilitate registering, updating, and deleting user accounts. The photo applications 65 may provide services to upload photographs, arrange photographs, set privacy options for albums and tag photographs with text strings. The event applications 67 provides services to create events, review upcoming events, and review past events. The group applications 69 may be used to maintain group information, display group information, and navigate to groups.

Figure 3:
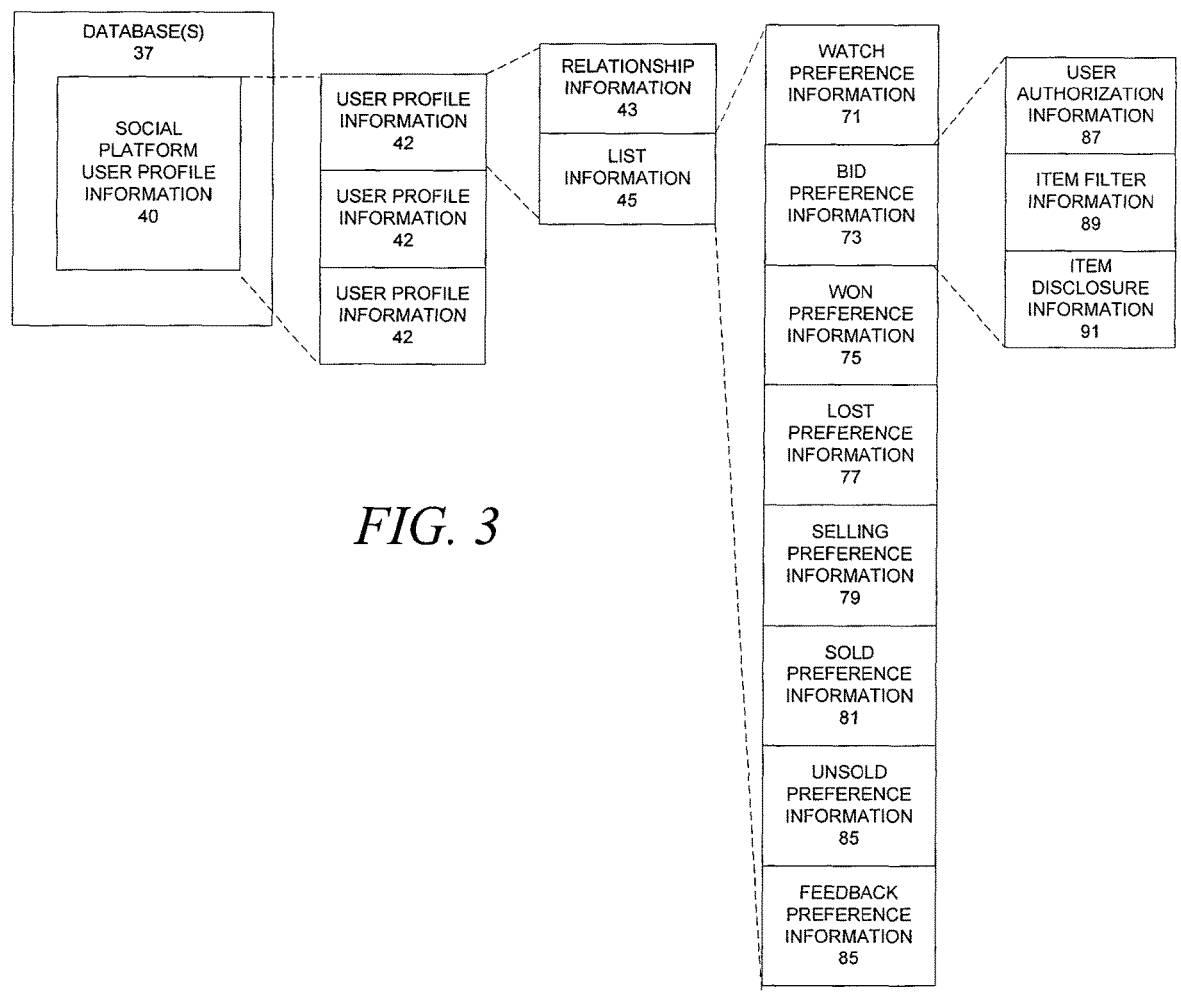
FIG. 3 is a block diagram illustrating a database, according to an embodiment.

FIG. 3 is a block diagram illustrating a database 37, according to an embodiment, at a network-based social platform 13. The database 37 is shown to store user profile information 42 for each user on the network-based social platform 13. The user profile information 42 may store relationship information 43 and list information 45. The relationship information 43 may store predetermined relationships between the identified user and other users on the network-based social platform 13. For example, a first user may be related to second user on the network-based social platform 13 as a "marketplace community member" or "friend," or "favourite friend." etc. The respective designations, "marketplace community member," "friend," and "favourite friend" may correspond to an increasing levels of disclosure.

The list information 45 may store disclosure preferences of a user for each of the lists owned and controlled by the user, as discussed further later. The watch preference information 71 may be associated with disclosure of listings of items on a watch list. The watch list may include items that the user desires to watch. For example, the user may be interested in a book (e.g., item) that is currently being auctioned.

The bid preference information 73 may be associated with disclosure of listings for items on a bid list. The bid list may include items for which the user has entered a bid.

The won preference information 75 may be associated with disclosure of listings for items on a won list. The won list may include items that have been won by the user in an auction.

The selling preference information 79 may be associated with disclosure of listings of items that are on a selling list. The selling list may include items being offered for sale or auction by the user.

The sold preference information 81 may be associated with disclosure of listings of items that are on a sold list. The sold list may include items that were offered for sale or auction by the user and subsequently sold.

The unsold preference information 83 may be associated with disclosure of listings of items on an unsold list. The unsold list may include items that were offered for sale or auction by the user and not sold.

The feedback preference information 85 may be associated with disclosure of feedback records that identify items. The feedback may identify items transacted on the network based marketplace 12 and include comments and ratings.

The user authorization information 87 may store the preference of a user for disclosure of item information for listings of items on each of the respective lists. Specifically, the user may prefer to disclose a minimum amount of item information, a maximum amount of item information, or not disclose item information for an item that is configured according to predetermined relationships including a "marketplace community member", a "friend", and a "favourite friend." A "marketplace community member" may be a user on the network-based social platform 13 that has added the marketplace application but is not a "friend" or a "favourite friend" of the user.

The item filter information 89 may be used to store the preference of a user for disclosing or not disclosing items for each of the respective lists. For example, the user may disclose items within a specific price range (e.g., 0-$0.99, $1.00-$9.99, $10.00-$99.00, etc.). Further for example, the user may disclose items categorized within a specific category (e.g., toys, books, automobiles). With regard to feedback preference information 85, the user may elect to disclose feedback associated with items within a specific price range and/or category.

The item disclosure information 91 may be used to store the preference of a user regarding the quantity of item information that is disclosed for a specific item on a list. Configurable parameters may include a summary disclosure parameter and a disclosure teaser parameter. Selection of the summary disclosure parameter may cause a maximum of item information to be displayed. For example, a photograph and text may appear with the item on a list. Selection of the teaser disclosure parameter may cause limited item information to be displayed. For example, disclosure may be limited to a photograph, graphic, or picture without the associated text. One advantage of limiting disclosure may be to prevent competitive bidding on an item. Of course "friends" may consent to disclosure of such information, as described herein.

Other embodiments may enable selection of the above described parameters according to other identified groups of users (e.g., friends living in San etc.). Yet other embodiments may enable selection according other groups of listings. Yet other embodiments may enable selection of the above described options according combinations of identified groups of users and identified groups of listings.

Marketplace and Payment Applications

Figure 4:
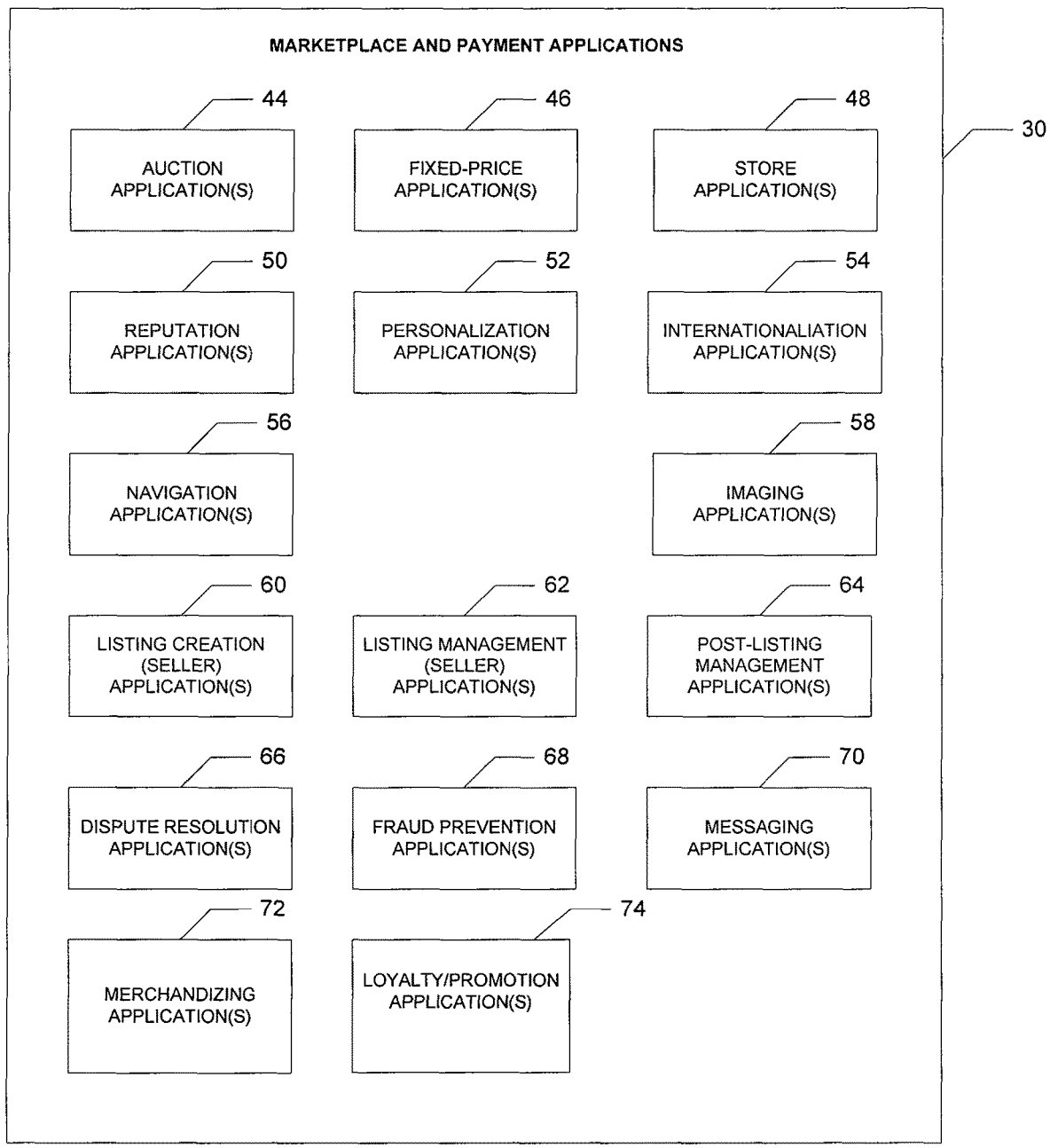
FIG. 4 is a block diagram illustrating marketplace and payment applications, according to an embodiment.

FIG. 4 is a block diagram illustrating multiple marketplace and payment applications 30, 32 that, in one exemplary embodiment of the present disclosure, are provided as part of the network-based marketplace 12. The marketplace 12 may provide a number of listing and price-setting mechanisms whereby a seller may list goods or services (e.g., items) for sale, a buyer can express interest in or indicate a desire to purchase such goods or services, and a price can be set for a transaction pertaining to the goods or services. To this end, the marketplace applications 30 are shown to include one or more auction applications 44 which support auction-format listing and price setting mechanisms (e.g., English, Dutch, Vickrey, Chinese, Double, Reverse auctions etc.). The various auction applications 44 may also provide a number of features in support of such auction-format listings, such as a reserve price feature whereby a seller may specify a reserve price in connection with a listing and a proxy-bidding feature whereby a bidder may invoke automated proxy bidding.

A number of fixed-price applications 46 support fixed-price listing formats (e.g., the traditional classified advertisement-type listing or a catalogue listing) and buyout-type listings. Specifically, buyout-type listings (e.g., including the Buy-It-Now (BIN) technology developed by eBay Inc., of San Jose, Calif.) may be offered in conjunction with an auction-format listing, and allow a buyer to purchase goods or services, which are also being offered for sale via an auction, for a fixed-price that is typically higher than the starting price of the auction.

Store applications 48 allow sellers to group their listings within a "virtual" store, which may be branded and otherwise personalized by and for the sellers. Such a virtual store may also offer promotions, incentives and features that are specific and personalized to a relevant seller.

Reputation applications 50 allow parties that transact utilizing the network-based marketplace 12 to establish, build and maintain reputations, which may be made available and published to potential trading partners. Consider that where, for example, the network-based marketplace 12 supports person-to-person trading, users may have no history or other reference information whereby the trustworthiness and credibility of potential trading partners may be assessed. The reputation applications 50 allow a user, for example through feedback provided by other transaction partners, to establish a reputation within the network-based marketplace 12 over time. Other potential trading partners may then reference such a reputation for the purposes of assessing credibility and trustworthiness.

Personalization applications 52 allow users of the marketplace 12 to personalize various aspects of their interactions with the marketplace 12. For example a user may, utilizing an appropriate personalization application 52, create a personalized reference page at which information regarding transactions to which the user is (or has been) a party may be viewed. Further, a personalization application 52 may enable a user to personalize listings and other aspects of their interactions with the marketplace 12 and other parties.

In one embodiment, the network-based marketplace 12 may support a number of marketplaces that are customized, for example, for specific geographic regions. A version of the marketplace 12 may be customized for the United Kingdom, whereas another version of the marketplace 12 may be customized for the United. States. Each of these versions may operate as an independent marketplace, or may be customized (or internationalized 54) presentations of a common underlying marketplace.

Navigation of the network-based marketplace 12 may be facilitated by one or more navigation applications 56. For example, a search application enables key word searches of listings published via the marketplace 12. A browse application allows users to browse various category, catalogue, or inventory data structures according to which listings may be classified within the marketplace 12. Various other navigation applications may be provided to supplement the search and browsing applications.

In order to make listings, available via the network-based marketplace 12, as visually informing and attractive as possible, the marketplace applications 30 may include one or more imaging applications 58 utilizing which users may upload images for inclusion within listings. An imaging application 58 also operates to incorporate images within viewed listings. The imaging applications 58 may also support one or more promotional features, such as image galleries that are presented to potential buyers. For example, sellers may pay an additional fee to have an image included within a gallery of images for promoted items.

Listing creation applications 60 allow sellers conveniently to author listings pertaining to goods or services (e.g., items) that they wish to transact via the marketplace 12, and listing management applications 62 to allow sellers to manage such listings. Specifically, where a particular seller has authored and/or published a large number of listings, the management of such listings may present a challenge. The listing management applications 62 provide a number of features (e.g., auto-relisting, inventory level monitors, etc.) to assist the seller in managing such listings. One or more post-listing management applications 64 also assist sellers with a number of activities that typically occur post-listing. For example, upon completion of an auction facilitated by one or more auction applications 44, a seller may wish to leave feedback regarding a particular buyer. To this end, a post-listing management application 64 may provide an interface to one or more reputation applications 50, so as to allow the seller conveniently to provide feedback regarding multiple buyers to the reputation applications 50. In addition, the post listing management applications 64 may facilitate tracking and organization of listings for a user by maintaining identified listings in lists. For example, the lists may include watch information in the form of identified items that are offered for sale on the network-based marketplace 12.

Dispute resolution applications 66 provide mechanisms whereby disputes arising between transacting parties may be resolved. For example, the dispute resolution applications 66 may provide guided procedures whereby the parties are guided through a number of steps in an attempt to settle a dispute. In the event that the dispute cannot be settled via the guided procedures, the dispute may be escalated to a third party mediator or arbitrator.

A number of fraud prevention applications 68 implement various fraud detection and prevention mechanisms to reduce the occurrence of fraud within the marketplace 12.

Messaging applications 70 are responsible for the generation and delivery of messages to users of the network-based marketplace 12, such messages for example advising users regarding the status of listings at the marketplace 12 (e.g., providing "outbid" notices to bidders during an auction process or to provide promotional and merchandising information to users).

Merchandising applications 72 support various merchandising functions that are made available to sellers to enable sellers to increase sales via the marketplace 12. The merchandising applications 80 also operate the various merchandising features that may be invoked by sellers, and may monitor and track the success of merchandising strategies employed by sellers.

The network-based marketplace 12 itself, or one or more parties that transact via the marketplace 12, may operate loyalty programs that are supported by one or more loyalty/promotions applications 74. For example, a buyer may earn loyalty or promotions points for each transaction established and/or concluded with a particular seller, and be offered a reward for which accumulated loyalty points can be redeemed.

Data Structures

Figure 5:
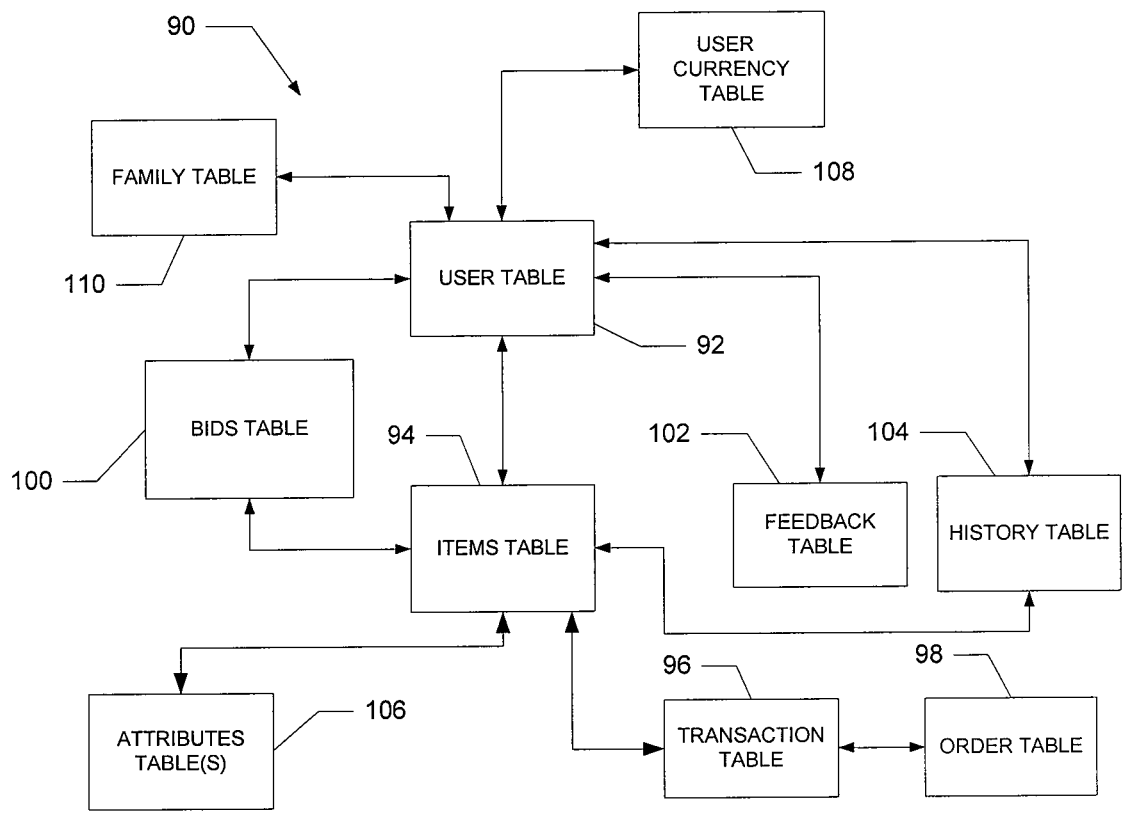
FIG. 5 is a high-level entity-relationship diagram, illustrating various tables stored on a database(s)

FIG. 5 is a high-level entity-relationship diagram, illustrating various tables 90 that may be maintained within the databases 36, and that are utilized by and support the marketplace and payment applications 30 and 32. A user table 92 contains a record for each registered user of the network-based marketplace 12, and may include identifier, address and financial instrument information pertaining to each such registered user. A user may, it will be appreciated, operate as a seller, a buyer, or both, within the network-based marketplace 12. In one exemplary embodiment of the present disclosure, a buyer may be a user that has accumulated value (e.g., commercial or proprietary currency), and is then able to exchange the accumulated value for items that are offered for sale by the network-based marketplace 12.

The tables 90 also include an items table 94 in which are maintained item records (e.g., item information) for goods and services that are available to be, or have been, transacted via the marketplace 12. Each item record within the items table 94 may furthermore be linked to one or more user records within the user table 92, so as to associate a seller and one or more actual or potential buyers with each item record.

A transaction table 96 contains a record for each transaction (e.g., a purchase transaction) pertaining to items for which records exist within the items table 94. An order table 98 is populated with order records, each order record being associated with an order. Each order, in turn, may be with respect to one or more transactions for which records exist within the transactions table 96.

Bid records within a bids table 100 each relate to a bid received at the network-based marketplace 12 in connection with an auction-format listing supported by an auction application 44. A feedback table 102 is utilized by one or more reputation applications 50, in one exemplary embodiment, to construct and maintain reputation information concerning users. In one embodiment, the reputation information may include feedback records associated with transactions. A history table 104 maintains a history of transactions to which a user has been a party. One or more attributes tables 106 record attribute information pertaining to items for which records exist within the items table 94. Considering only a single example of such an attribute, the attributes tables 106 may indicate a currency attribute associated with a particular item, the currency attribute identifying the currency of a price for the relevant item as specified in by a seller.

Figure 6:
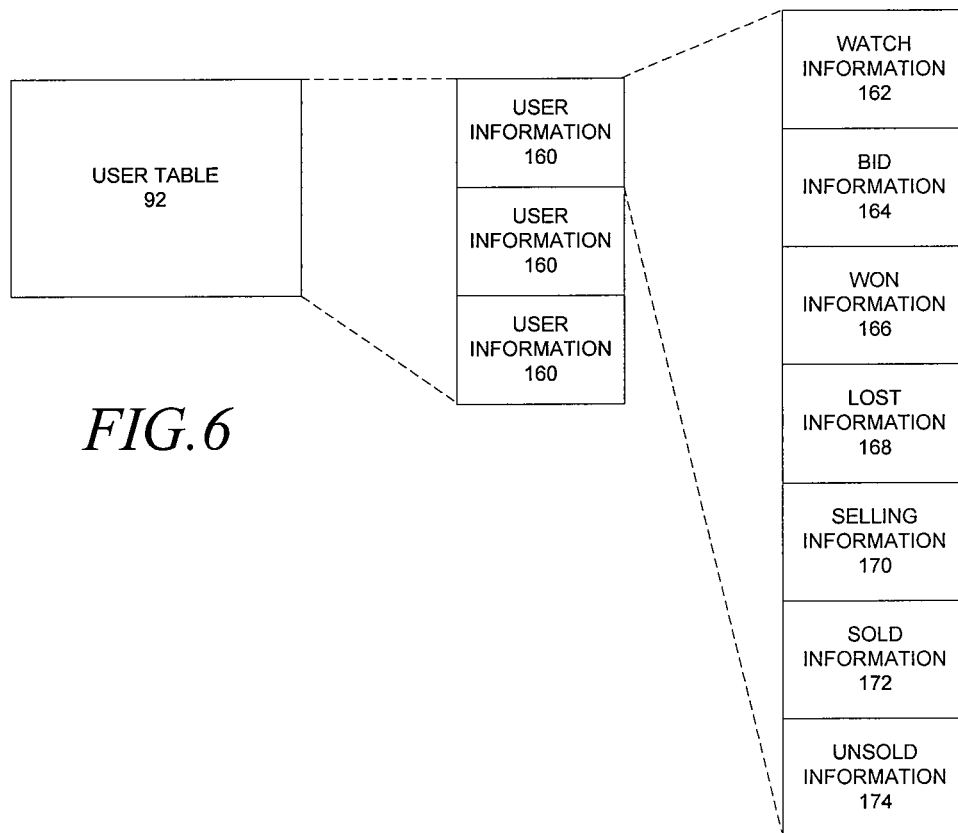
FIG. 6 is a block diagram illustrating a user table, according to an embodiment.

FIG. 6 is a block diagram illustrating a user table 92, according to an embodiment. The user table 92 includes a user information 160 for each user on the network-based marketplace 12. Each user information 160 may store watch information 162, bid information 164, won information 166, lost information 168, selling information 170, sold information 172, and unsold information 174 that respectively store item identifiers associated with on the network-based marketplace 12 that the user monitors.

Figure 7:
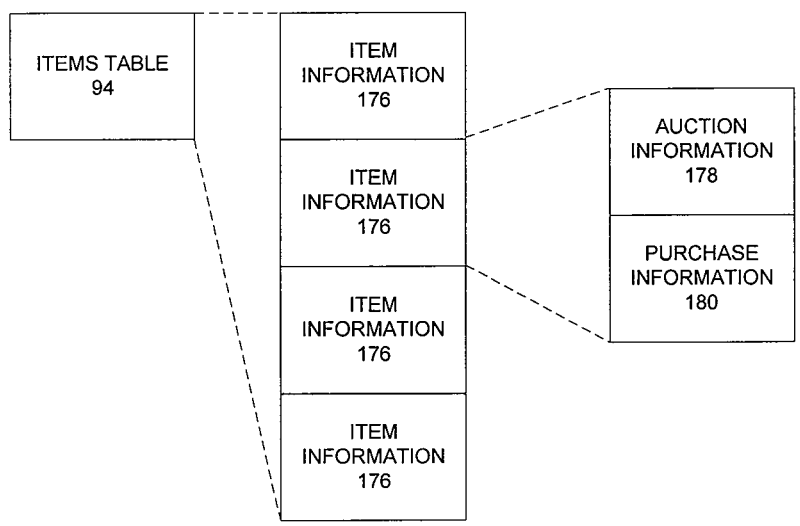
FIG. 7 is a block diagram illustrating an items table, according to an embodiment.

FIG. 7 is a block diagram illustrating an items table 94, according to an embodiment. The items table 94 stores a item information 176 (e.g., listing information) for each item on the network-based marketplace 12. For example, the item information 176 may store a title, a description, a photograph, or any other information or content descriptive of goods or services that may be offered for sale on the network-based marketplace 12. The item information 176 is specifically shown to store auction information 178 and purchase information 180. The auction information 178 may store information related to the auctioning of the item (e.g., minimum bid, current bid, highest bid, start time of auction, end time of auction, etc.). The purchase information 180 may store information related to the purchase of the item (e.g., purchase price). In one embodiment, a item offered for sale on the network-based marketplace 12 may be acquired by submitting the highest bid in an auction or by paying a predetermined purchase price.

Figure 8:
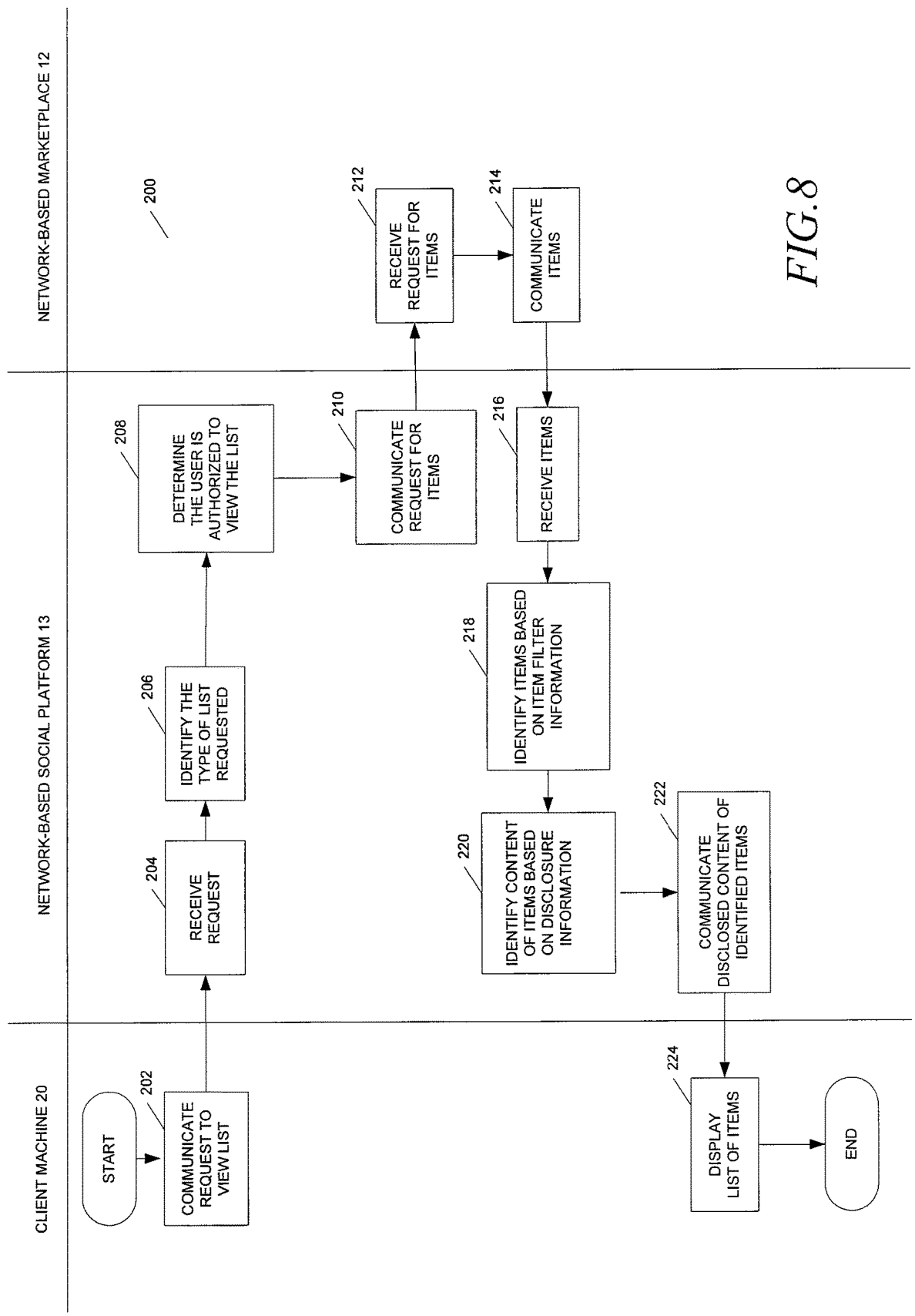
FIG. 8 is a block diagram illustrating a method, according to an embodiment, to view a list.

FIG. 8 is a block diagram illustrating a method 200, according to an embodiment, to view a list of items for sale on a network-based marketplace. Illustrated on the right may be operations performed on the network-based marketplace 12. Illustrated in the middle may be operations performed on the network-based social platform 13 and illustrated on the left may be operations performed on the client machine 20.

The method 200 may commence, at operation 202, with a first user requesting to view a list of a second user on the network-based social platform 13. Specifically, when operation 202 is executed, the client machine 20 receives the request and communicates the request to the network-based social platform 13. The requested list may include one or more listings of items that appear on a watch list, a bid list, a won list, a lost list, a selling list, a sold list an unsold list or feedback.

At operation 204, the communication module 39, at the network-based social platform 13, may receive the request and at operation 206, the processing module 41 identifies the type of list requested. For example, the first user may be requesting to view the bid list of the second user. At operation, 208, the processing module 41 determines whether the user that requested to view the list is authorized to view the list. For example, the processing module 41 may compare a predetermined relationship between the first user and the second user to preferences configured by the second user to determine a level of disclosure, if any. In an example where the second user prefers to disclose the requested list to the first user, at operation, 210, the processing module 41 communicates the request for a list of items (e.g., bid list) to the network-based marketplace 12.

At operation 212, the network-based marketplace 12 may receive the request and, at operation 214, the network-based marketplace 12 may communicate item information 176 for each of the items on the requested list.

At operation 216, at the network-based social platform 13, the communication module 39 receives item information 176 for the items and at operation 218 the processing module 41 identifies the items on the list to be disclosed (e.g., displayed) to the first user based on the appropriate item filter information 65. For example, the second user may prefer to disclose only items in a specific price range (e.g., $1.00-$99.00) or in a specific category (e.g., Toys).

At operation 220, the processing module 41 identifies item information 176 for each item to be disclosed to the first user. For example, the second user may prefer to disclose only a picture (e.g., teaser disclosure) of the items on the bid list. In another example, the second user may prefer to disclose a picture and text (e.g., summary disclosure). At operation, 222, the communication module 39 communicates the disclosed item information 176 of the identified items to the network-based marketplace interface module 33 that in turn, communicates the same to the social applications 31 that in turn, communicates the same to the client machine 20.

At operation 224, the client machine 20 displays the disclosed content of the identified items to the first user.

Figure 9:
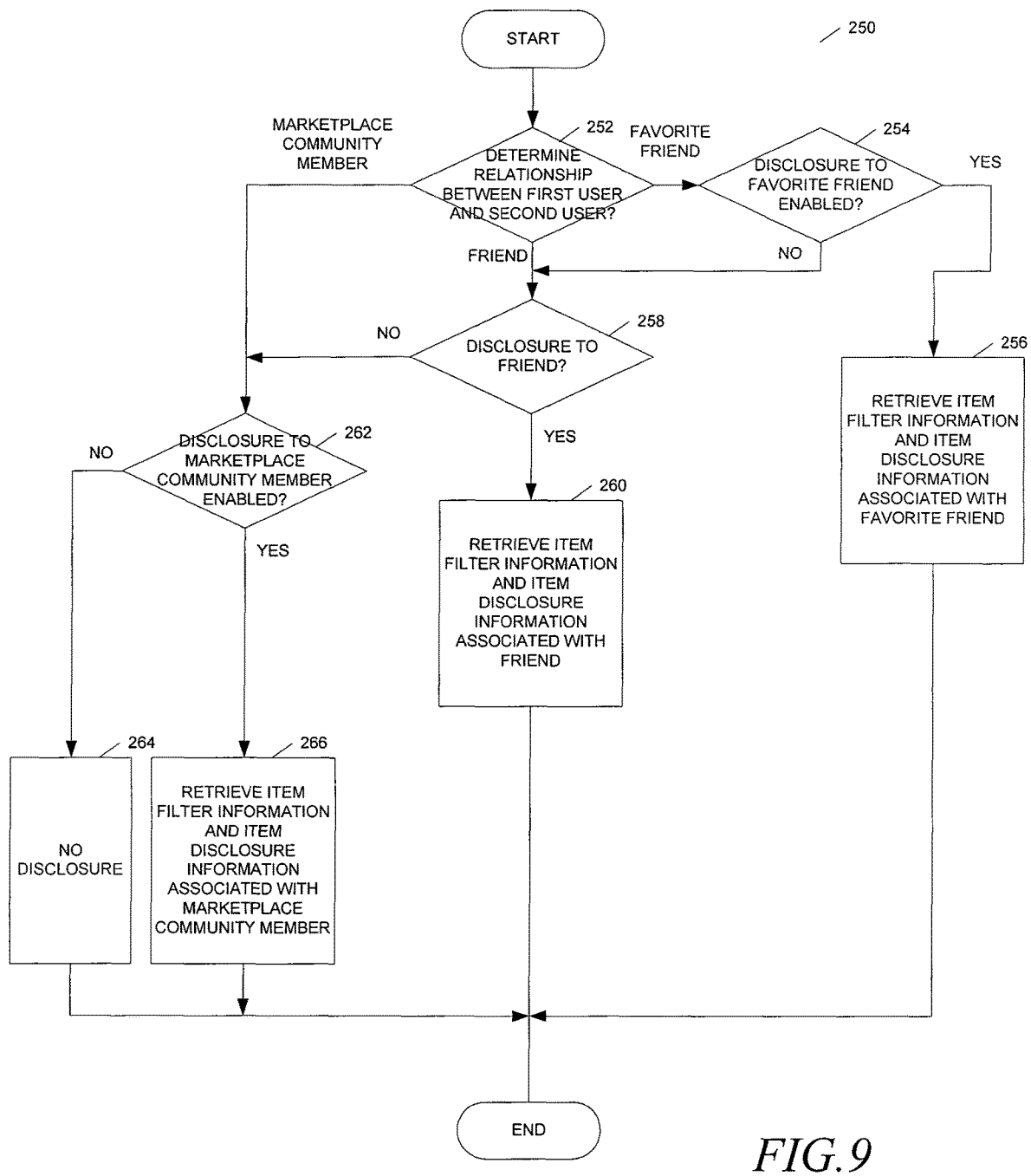
FIG. 9 is a block diagram illustrating a method, according to an embodiment, to determine whether a user is authorized to view a list.

FIG. 9 is a block diagram illustrating a method 250, according to an embodiment, to determine whether a user is authorized to view a list. The present example illustrates a first user requesting to view a bid list of a second user. The method 250 corresponds to the operation 208 on FIG. 8.

The method 250 commences at operation 252, at the network-based social platform 13, with the processing module 41 determining the relationship between a first user on a network-based social platform 13 and a second user on the network-based social platform 13. In one embodiment, the processing module 41 may use the relationship information 43 associated with the first user to identify the predetermined relationship between the first and the second user. In another embodiment, the processing module may use the relationship information 43 associated with the second user. If the predetermined relationship is determined to be a "favourite friend" then a branch is made to decision operation 254. If the predetermined relationship is determined to be a "friend" then a branch is made to decision operation 258. If the predetermined relationship is determined to be a "marketplace community member" then a branch is made to decision operation 262.

At decision operation 254, the processing module 41 determines whether disclosure to a "favourite friend" is enabled. In the present example, the processing module 41 may utilize user authorization information 87 associated with the second user and the bid list. If the second user has enabled disclosure then a branch is made to operation 256. Otherwise a branch is made to decision operation 258.

At operation 256, the processing module 41 retrieves item filter information 89 and item disclosure information 67 associated with the "favourite friend" relationship for the bid list as configured by the second user.

At decision operation 258, the processing module 41 determines whether disclosure of the requested list to a "friend" is enabled. In the present example, the processing module 41 may utilize the user authorization information 87 associated with the second user and the bid list. If the second user has enabled disclosure then a branch is made to operation 260. Otherwise a branch is made to decision operation 262.

At operation 260, the processing module 41 retrieves item filter information 89 and item disclosure information 67 associated with the "friend" relationship for the bid list as configured by the second user.

At decision operation 262, the processing module 41 determines whether disclosure of the requested list to a "marketplace community member" is enabled. In the present example, the processing module 41 may utilize user the authorization information 63 associated with the second user and the bid list. If the second user has enabled disclosure then a branch is made to operation 260. Otherwise a branch is made to decision operation 262.

At operation 266, the processing module 41 retrieves item filter information 89 and item disclosure information 67 associated with the "marketplace community member" relationship for the bid list as configured by the second user. At operation 264, the processing module 41 registers no disclosure of the requested list.

Figure 10:
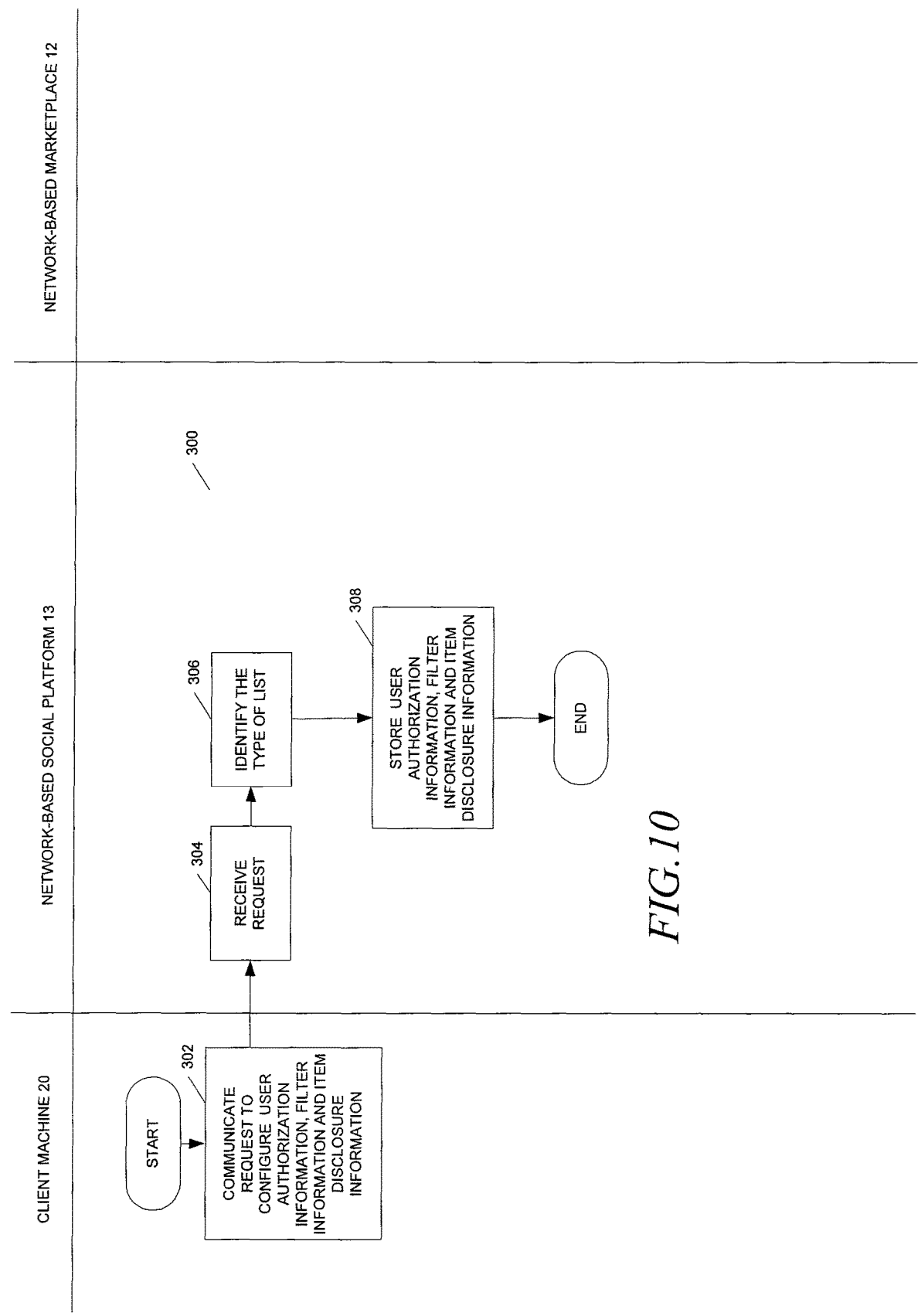
FIG. 10 is a block diagram illustrating a method, according to an embodiment, to receive control information for viewing a list.

FIG. 10 is a block diagram illustrating a method 300, according to an embodiment, to receive control information for viewing a list. In one embodiment, the control information may include user authorization information 87, item filter information 89 and item disclosure information 91. Illustrated on the right may be operations performed on the network-based marketplace 12. Illustrated in the middle may be operations performed on the network-based social platform 13 and illustrated on the left may be operations performed on the client machine 20.

The method 300 may commence, at operation 302, with the client machine 302 communicating a request to store control information for a particular list (e.g., bid list, won list, watch list, etc.). For example, client machine 20 may have received the control information from a first user before communicating the control information to the network-based social platform 13. In one embodiment, the control information may specify the type and quantity of information on a particular list that may be viewed by other users according to predetermined relationships.

At operation 304, at the network-based social platform 13, the communication module 39 receives the request and at operation 306 the processing module 41 identifies the list according to the request. At operation 308, the processing module 41 stores the user authorization information 87, item filter information 65, and item disclosure information 67, as previously described, for the specified list.

Figure 11:
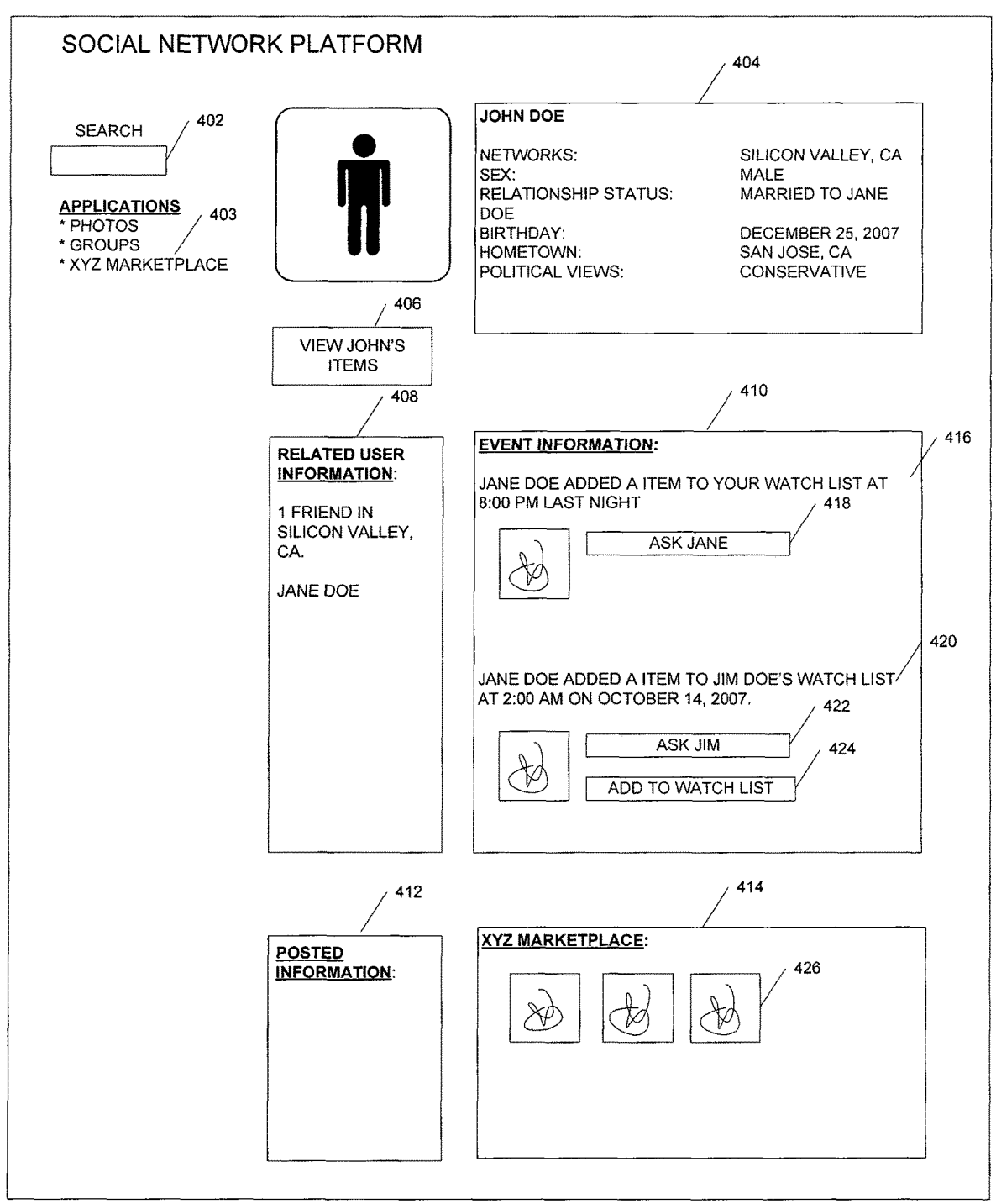
FIGS. 11-16 are diagrams illustrating user interfaces, according to an embodiment.

FIG. 11 is a diagram illustrating a user interface 400, according to an embodiment, of a user profile. The user profile may include user profile information 42 for the user featured by the user profile. The user profile may be displayed by the network-based social platform 13 to the user featured by the profile on the client machines 20, 22. A portion or all of the user profile information 42 may also be displayed to others users on the network-based social platform 13 according to a relationship with the user featured by the profile. In one embodiment, the quantity of information that may appear on the profile to a user viewing the profile may increase based on the relationship (e.g., "social networking platform user," "marketplace community member," "friend," "favorite friend," etc.). The user interface 400 may include an input box 402 to enter keywords that may be used to search the network-based social platform 13, a user interface element 403 to launch the XYZ marketplace application, user status information 404, a user interface element 406 to view lists of items associated with the user that owns the profile, related user information 408, event information 410, posted information 412, and application information 414.

The status information 404 includes information about the user. The event information 410 may chronicle actions performed by the user associated with the profile (e.g., John Doe) or actions performed by other users (e.g., "marketplace community member", "friend," "favorite friend," etc.) on the network-based social platform 13. The related user information 408 may include information about other users that are related (e.g., "friends") to the user featured by the profile. The event information 410 enables a user viewing the profile to quickly and easily see some of the most recent actions of the user that owns the profile or other users. The posted information 412 may include content posted by the user associated with the profile (e.g., "John Doe"). Accordingly, the posted information 412 enables the user to share content with other users on the network-based social platform 13. For example, posted content may include websites, blogs, videos, and songs that may be found on the Internet. Posted content may also include content from the network-based social platform 13 including profiles, photos, notes, groups, and events. In one embodiment content may be posted by copying and pasting a URL, selecting a share button located on user interfaces of the network-based social platform 13 or selecting a share button located on a third party server 40. The application information 414 is shown to include information for the application "XYZ Marketplace" The content of the application information 414 may be communicated from the network-based marketplace 12 based on an identifier associated with the user associated with the user profile. The application information 414 is shown to include user interface elements 426 (e.g., images) of items that may appear on any of the lists associated with the user (e.g., watch, bid, won, etc.). If a user other than the user associated with the profile is viewing the profile then the user interface elements 426 may be displayed based on the relationship of the viewing user with the user associated with the profile (e.g., "John Doe"), as previously described. In the present example, the user interface elements 426 may be associated with a minimal level of disclosure (e.g., teaser disclosure). In another example, the application information 414 may display a search box to search for listings of items. For example, the application information 414 may display a search box to search for listings of items responsive to determining no listings are on any of the lists associated with the user (e.g., watch, bid, won, etc.). The user interface elements 426 may be respectively selected by the user viewing the profile to display additional information (e.g., summary disclosure). In one embodiment, selection of the user interface element 426 may not do anything (e.g., teaser disclosure).

Figure 12:
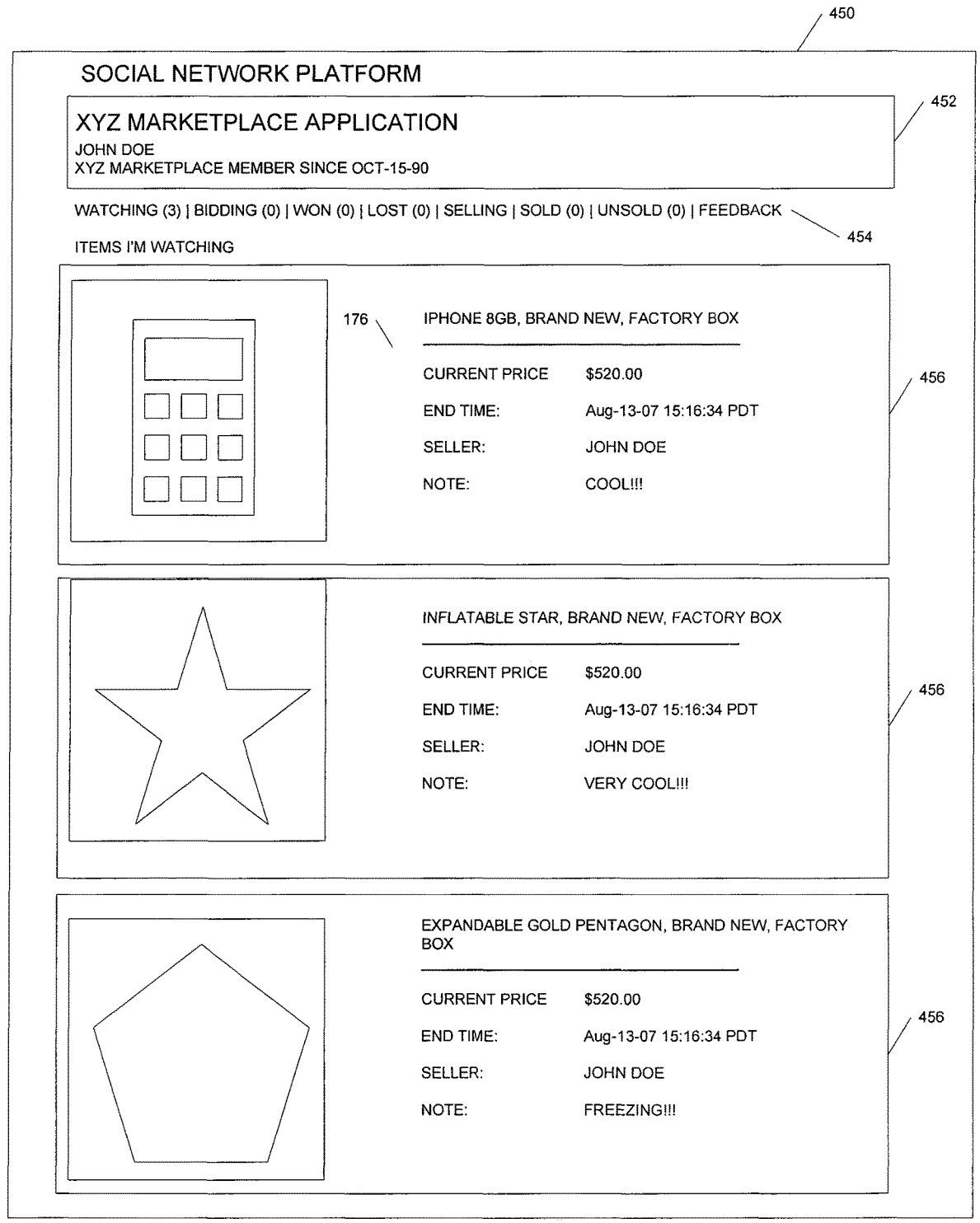

FIG. 12 is a diagram illustrating a user interface 450, according to an embodiment, to view a watch list of a user. For example, the user interface 450 is displayed to a "John Doe" and the watch list is owned by "John Doe." The watch list includes user interface elements 452 that identities the viewing user (e.g., John Doe), user interface elements 454 that may be respectively selected to view the named lists (e.g., bidding, won, etc.) of items, and listings 456 of items offered for sale on a network-based marketplace 12. The listings 456 of items include item information 176 descriptive of the item for sale on the network based marketplace 12.

Figure 13:
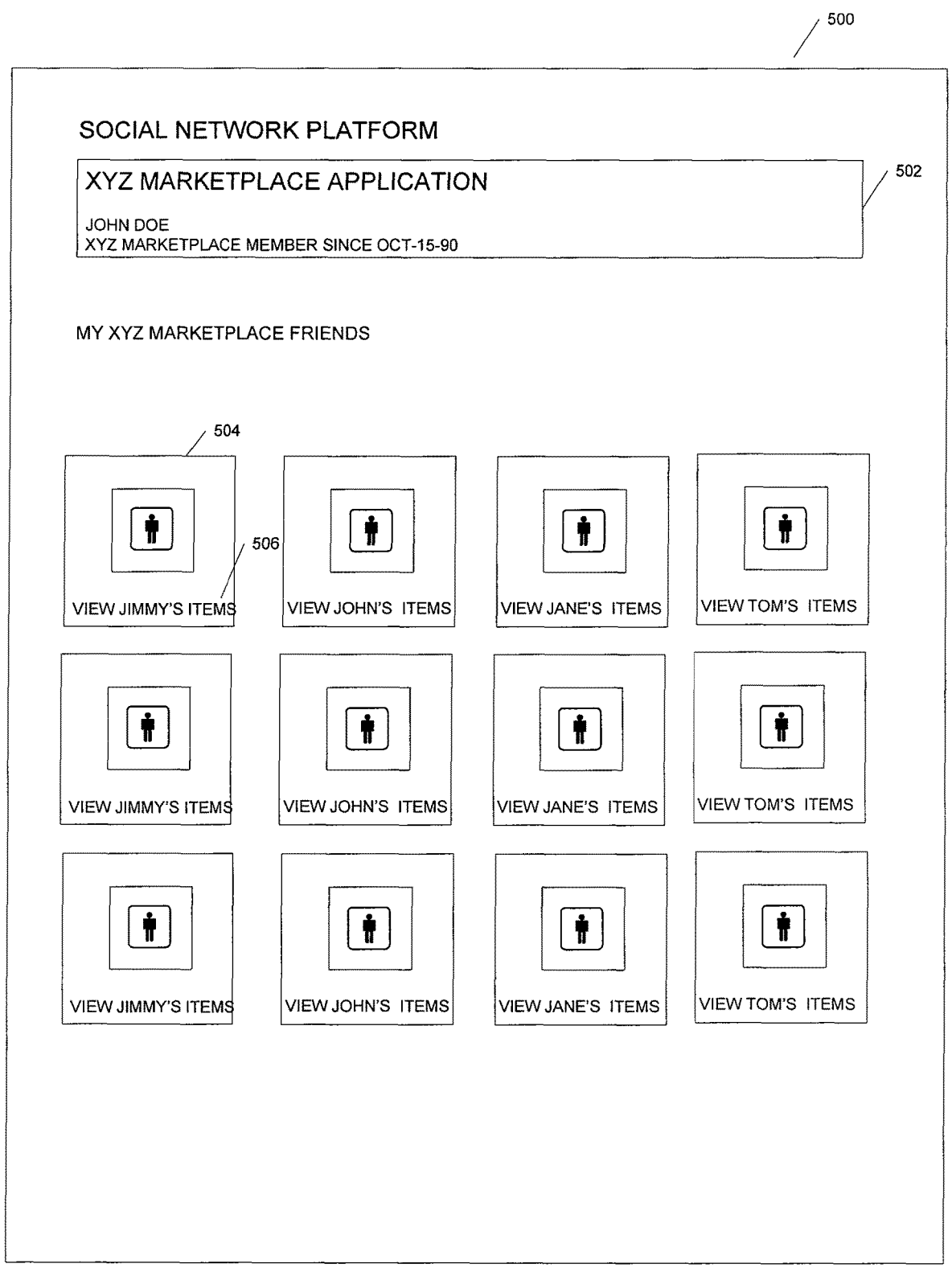

FIG. 13 is diagram illustrating a user interface 500, according to an embodiment, to view shopping information. The user interface 500 may be displayed by the network based social platform 13 and includes a user interface element 502 that identifies the logged in user (e.g., username, John Doe, associated with username and password provided at login) and multiple interface elements 504 each of which is associated with a user that may be a "friend" or "favorite friend" of the viewing user. Each user interface element 504 includes a user interface element 506 that may be selected to view the lists of items (e.g., watch, bid, etc.) of the user featured by the user interface element 504.

Figure 14:
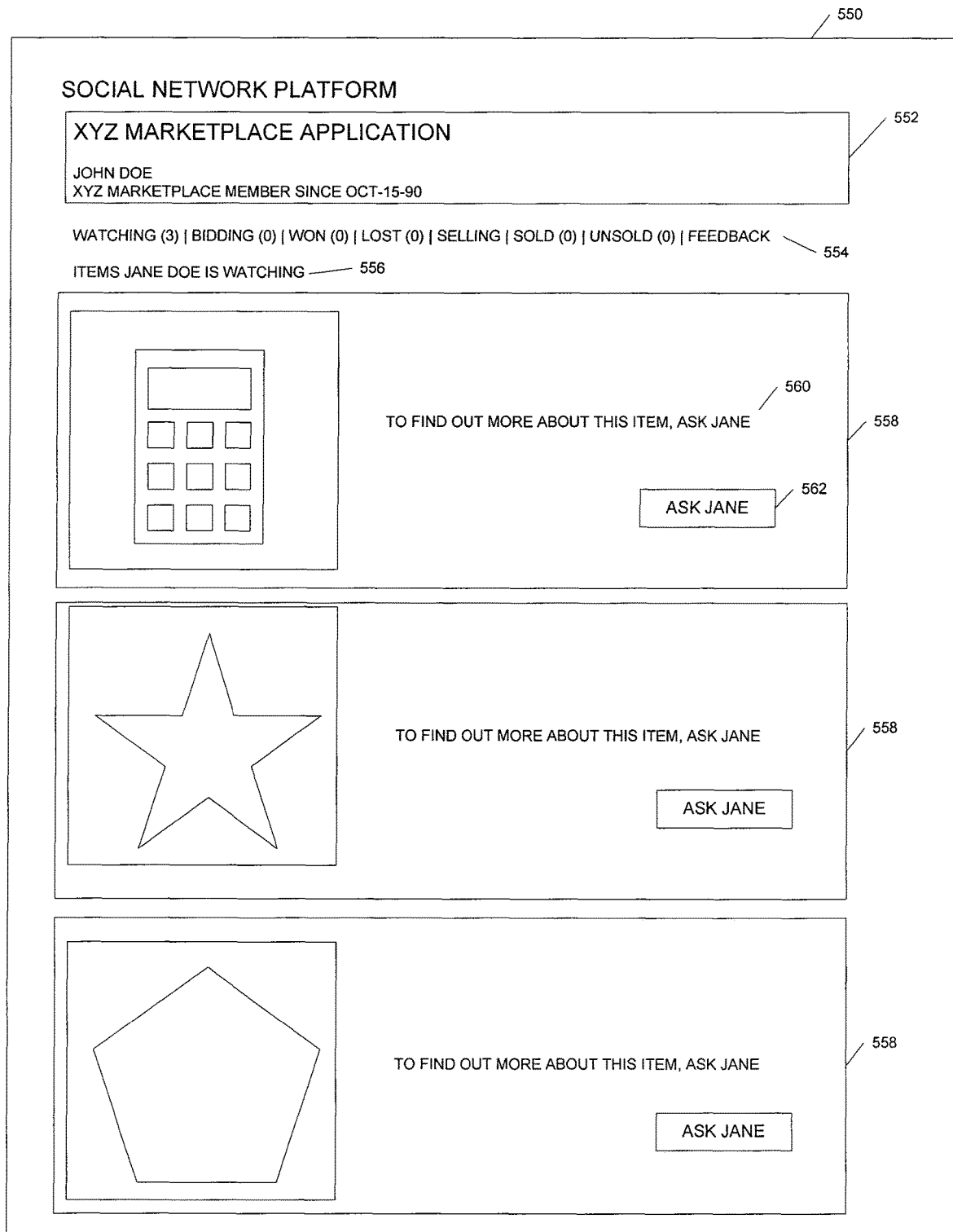

FIG. 14 is diagram illustrating a user interface 550, according to an embodiment, to view a watch list of another user. For example, the user interface 550 is displayed to a "John Doe" (e.g., logged in user) and the watch list is owned by "Jane Doe." The user interface 550 may be displayed by the network based social platform 13 and includes listings 558 of items each of which include a text string 560 and a selectable user interface element 562. As shown, the listing 558 includes limited item information 176 (e.g., image) because the user that owns the watch list (e.g., "Jane Doe") has configured a "teaser disclosure" setting for the list based on a relationship with the user that is viewing the watch list. In another embodiment, the user may disclose additional item information 176 (e.g., description of item, highest bid, auction end time, etc.) or no item information 176. If the user configures no item information 176 then user interface 500 may include a message indicating that the user is not sharing the watch list. The user interface element 562 may be selected to communicate a message to the owner of the watch list (e.g., "Jane Doe"). The message may identify the listing of the item and a message from the user.

Figure 15:
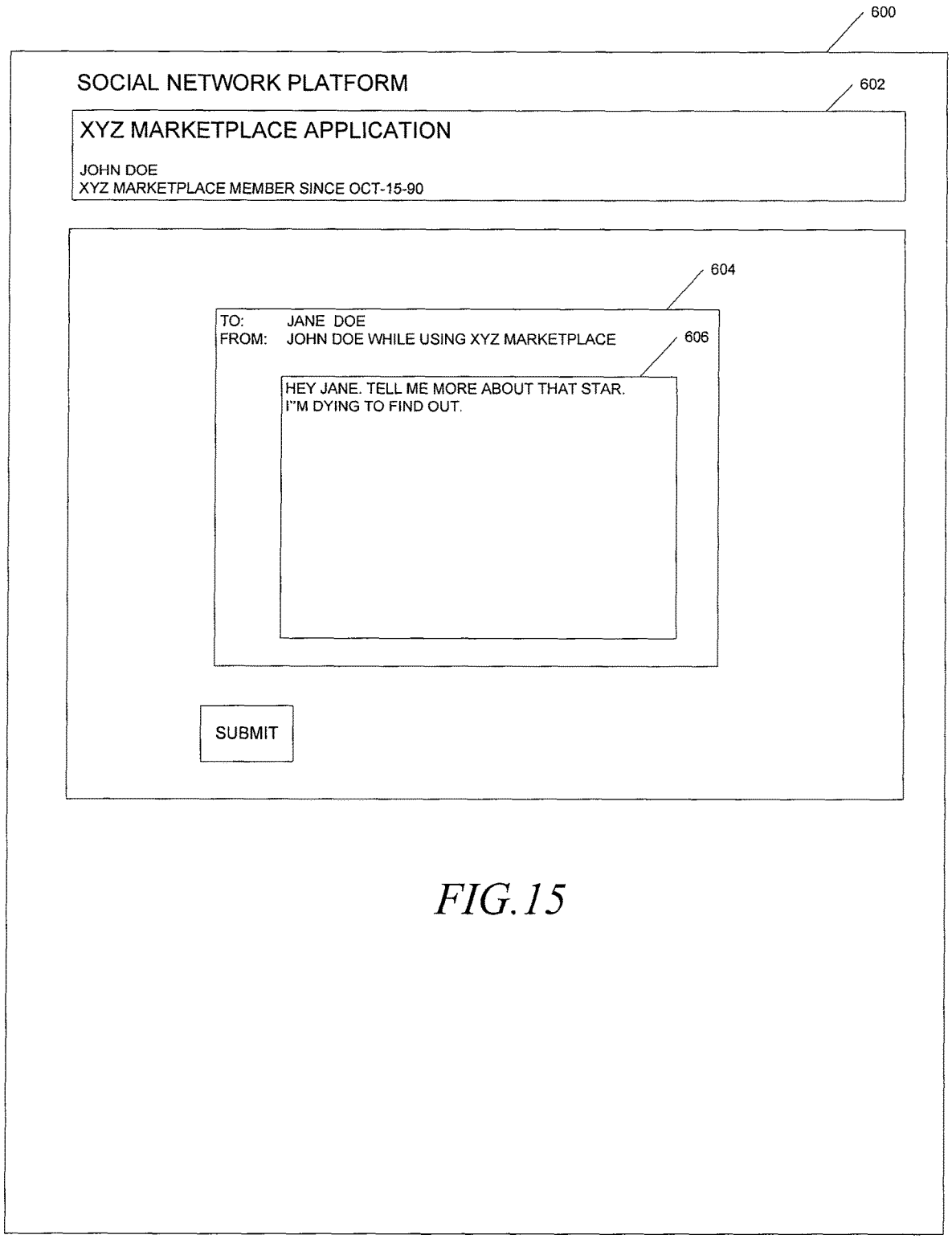

FIG. 15 is diagram illustrating a user interface 600, according to an embodiment, to communicate a message. For example, the user interface 600 is displayed to a "John Doe" who is communicating a message to a "Jane Doe." The user interface 660 may be displayed by the network based social platform 13 and includes user interface elements 602 that identifies the logged in user (e.g., John Doe) and a message 604 that includes an input box 606. The message may be automatically addressed as "From" the viewing user and "To" another user whom the viewing user identified on a previous user interface.

Figure 16:
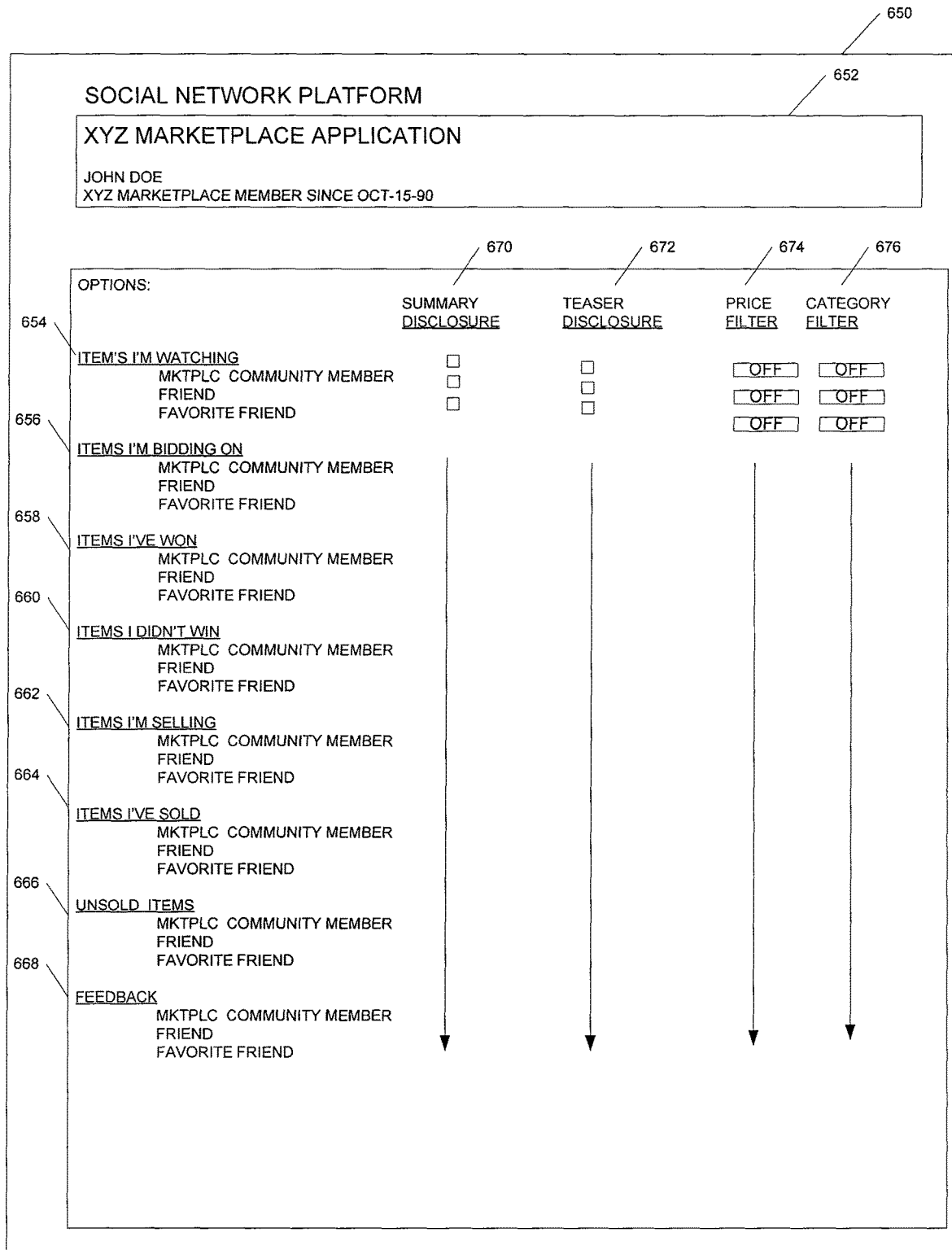

FIG. 16 is diagram illustrating a user interface 650, according to an embodiment, to receive configurable parameters. The user interface 650 may be displayed by the network based social platform 13 and used to receive configurable parameters that are selected by the viewing user. The configurable parameters are related to the type and quantity of information disclosed to users on the network-based social platform 13. The user interface 650 and includes user interface elements 652 that identifies the logged in user (e.g., John Doe). Accordingly, the received parameters are applicable to disclosure of information for the lists owned by the viewing user and feedback on the viewing user. The user interface 650 enables selection of configurable parameters by the viewing user on the network-based social platform 13 according to lists owned by the viewing user and relationships with other users on the network-based social platform 13. Specifically, the relationships may include "community marketplace community member," "friend," and "favourite friend," The lists include a watch list 654, a bid list 656, a won list 658, a lost list 660, a selling list 662, a sold list 664, and an unsold list 666. The user interface 650 further enables selection of configurable parameters for feedback left by other users on the network-based marketplace 12 for the viewing user. Feedback represents a users permanent reputation on the network-based marketplace 12, Feedback (e.g., feedback records) may include comments and ratings left by other network-based marketplace 12 users from whom the viewing user has bought items and/or to whom the viewing user has sold items.

According to one embodiment, the user interface 650 is shown to include a summary disclosure parameter 670, a teaser disclosure parameter 672, a price filter 674, and a category filter 676. A set of parameters and filters may be configured for each list/feedback according to a relationship. The summary disclosure 670 and teaser disclosure 672 may be mutually exclusive. Accordingly, the user may select one or the other but not both. Selection of the summary disclosure 670 may cause maximum amount of item information 176 to be disclosed (e.g., Title, Description, reserve price, highest bid, purchase price, graphic, picture, etc.) and selection of the teaser disclosure 672 may cause a minimum amount of item information 176 to be disclosed. For example, an image, graphic or picture may be disclosed without additional item information 176. Not selecting the summary disclosure 670 or the teaser disclosure 672 may prevents disclosure of item information 176. The price filter 674 may be configured "OFF" or to a specific price range. The price filter may include a pull-down menu with price ranges (e.g., 0-$0.99, $1.00-$9.99, $10.00-$99.00, etc.) that are displayed for selection by the user. For example, selection of a price range 0-$0.99 may cause display of listings of items with a minimum bid or selling price within the price range. The category filter may be configured "OFF" or to a specific category. For example, the category filter 676 may include a pull-down menu with categories (e.g., toys, books, automobiles) that are displayed for selection by the user. For example, selection of a category "toys" may cause display of listings of items in the category "toys" on the network-based marketplace 12. Other embodiments may enable selection of the above described options according to other combinations of the identified groups of users and the identified groups of listings.

Figure 17:
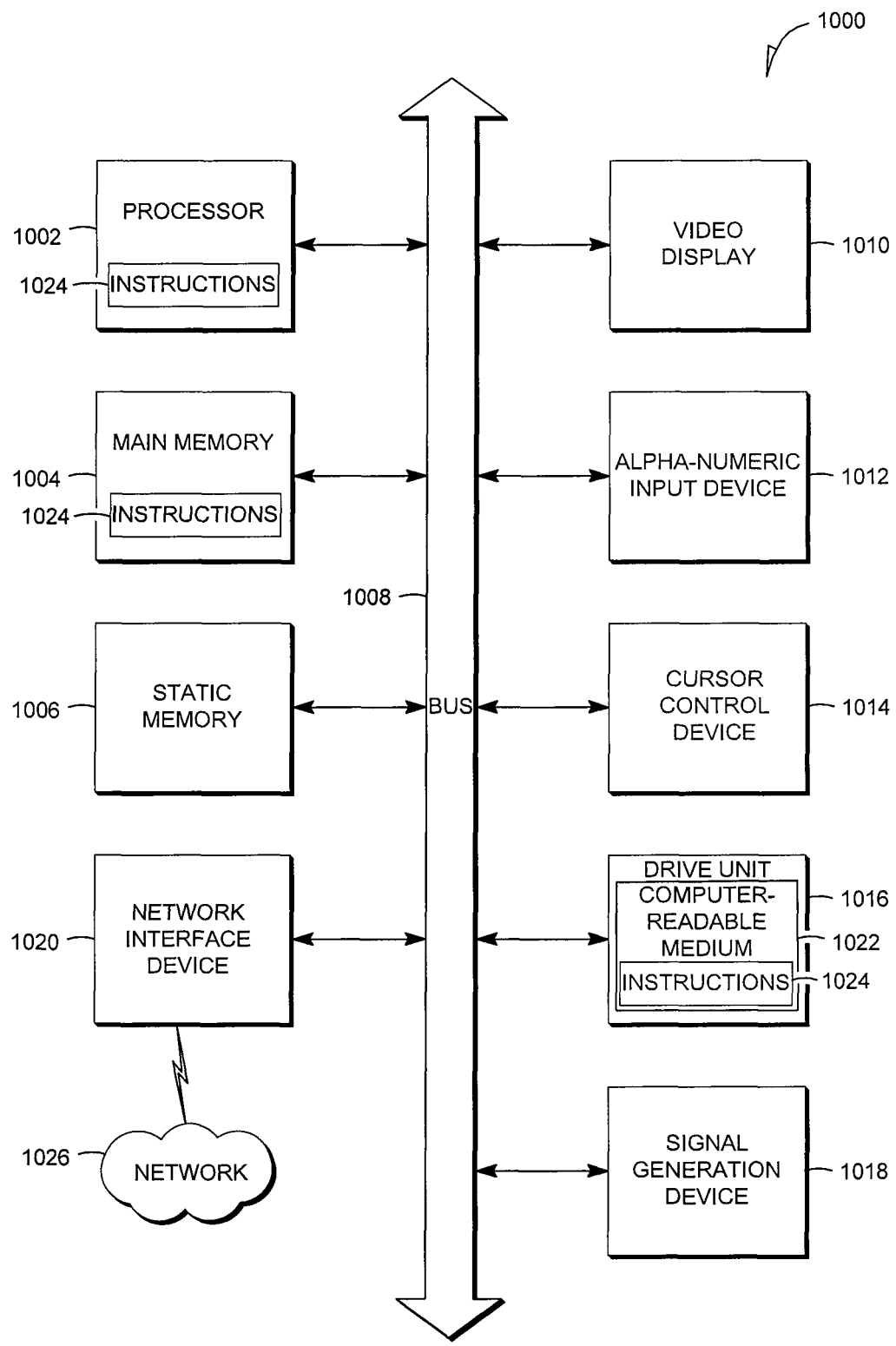
FIG. 17 is a block diagram of a machine, according to an example embodiment, including instructions to perform any one or more of the methodologies described herein.

FIG. 17 is a diagrammatic representation of a machine in the example form of a computer system 1000 within which a set of instructions, for causing the machine to perform any one or more of the methodologies discussed herein, may be executed. In alternative embodiments, the machine operates as a standalone device or may be connected (e.g., networked) to other machines, in a networked deployment, the machine may operate in the capacity of a server or a client machine in server-client network environment, or as a peer machine in a peer-to-peer (or distributed) network environment. The machine may be a server computer, a client computer, a personal computer (PC), a tablet PC, a set-top box (STB), a Personal Digital Assistant (PDA), a cellular telephone, a web appliance, a network router, switch or bridge, or any machine capable of executing a set of instructions (sequential or otherwise) that specify actions to be taken by that machine. Further, while only a single machine is illustrated, the term "machine" shall also be taken to include any collection of machines that individually or jointly execute a set (or multiple sets) of instructions to perform any one or more of the methodologies discussed herein.

The example computer system 1000 includes a processor 1002 (e.g., a central processing unit (CPU) a graphics processing unit (GPU) or both), a main memory 1004 and a static memory 1006, which communicate with each other via a bus 1008. The computer system 1000 may further include a video display unit 1010 (e.g., a liquid crystal display (LCD) or a cathode ray tube (CRT)). The computer system 1000 also includes an alphanumeric input device 1012 (e.g., a keyboard), a cursor control device 1014 (e.g., a mouse), a disk drive unit 1016, a signal generation device 1018 (e.g., a speaker) and a network interface device 1020.

The disk drive unit 1016 includes a machine-readable medium 1022 on which is stored one or more sets of instructions (e.g., software 1024) embodying any one or more of the methodologies or functions described herein. The software 1024 may also reside, completely or at least partially, within the main memory 1004 and/or within the processor 1002 during execution thereof by the computer system 1000, the main memory 1004 and the processor 1002 also constituting machine-readable media.

The software 1024 may further be transmitted or received over a network 14 via the network interface device 1020.

While the machine-readable medium 1022 is shown in an example embodiment to be a single medium, the term "machine-readable medium" should be taken to include a single medium or multiple media (e.g., a centralized or distributed database, and/or associated caches and servers) that store the one or more sets of instructions. The term "machine-readable medium" shall also be taken to include any medium that is capable of storing, encoding or carrying a set of instructions for execution by the machine and that cause the machine to perform any one or more of the methodologies of the present disclosure. The term "machine-readable medium" shall accordingly be taken to include, but not be limited to, solid-state memories, optical and magnetic media, and carrier wave signals.

A Three-Tier Architecture

In some embodiments, a method is illustrated as implemented in a distributed or non-distributed software application designed under a three-tier architecture paradigm, whereby the various components of computer code that implement this method may be categorized as belonging to one or more of these three tiers. Some embodiments may include a first tier as an interface (e.g., an interface tier) that is relatively free of application processing. Further, a second tier may be a logic tier that performs application processing in the form of logical/mathematical manipulations of data inputted through the interface level, and communicates the results of these logical/mathematical manipulations to the interface tier, and/or to a backend, or storage tier. These logical/mathematical manipulations may relate to certain business rules, or processes that govern the software application as a whole. A third, storage tier, may be a persistent storage medium or, non-persistent storage medium. In some cases, one or more of these tiers may be collapsed into another, resulting in a two-tier architecture, or even a one-tier architecture. For example, the interface and logic tiers may be consolidated, or the logic and storage tiers may be consolidated, as in the case of a software application with an embedded database. This three-tier architecture may be implemented using one technology, or, as will be discussed below, a variety of technologies. This three-tier architecture, and the technologies through which it is implemented, may be executed on two or more computer systems organized in a server-client, peer to peer, or so some other suitable configuration. Further, these three tiers may be distributed between more than one computer system as various software components.

Modules, Components and Logic

Certain embodiments are described herein as including logic or a number of modules, components or mechanisms. A module, logic, component or mechanism (herein after collectively referred to as a "module") may be a tangible unit capable of performing certain operations and is configured or arranged in a certain manner. In example embodiments, one or more computer systems (e.g., a standalone, client or server computer system) or one or more components of a computer system (e.g., a processor or a group of processors) may be configured by software (e.g., an application or application portion) as a "module" that operates to perform certain operations as described herein.

In various embodiments, a "module" may be implemented mechanically or electronically. For example, a module may comprise dedicated circuitry or logic that is permanently configured (e.g., within a special-purpose processor) to perform certain operations. A module may also comprise programmable logic or circuitry (e.g., as encompassed within a general-purpose processor or other programmable processor) that is temporarily configured by software to perform certain operations. It will be appreciated that the decision to implement a module mechanically, in the dedicated and permanently configured circuitry, or in temporarily configured circuitry (e.g., configured by software) may be driven by cost and time considerations.

Accordingly, the term "module" should be understood to encompass a tangible entity, be that an entity that is physically constructed, permanently configured (e.g., hardwired) or temporarily configured (e.g., programmed) to operate in a certain manner and/or to perform certain operations described herein. Considering embodiments in which modules or components are temporarily configured (e.g., programmed), each of the modules or components need not be configured or instantiated at any one instance in time. For example, where the modules or components comprise a general-purpose processor configured using software, the general-purpose processor may be configured as respective different modules at different times. Software may accordingly configure the processor to constitute a particular module at one instance of time and to constitute a different module at a different instance of time.

Modules can provide information to, and receive information from, other modules. Accordingly, the described modules may be regarded as being communicatively coupled. Where multiple of such modules exist contemporaneously, communications may be achieved through signal transmission (e.g., over appropriate circuits and buses) that connect the modules. In embodiments in which multiple modules are configured or instantiated at different times, communications between such modules may be achieved, for example, through the storage and retrieval of information in memory structures to which the multiple modules have access. For example, a one module may perform an operation, and store the output of that operation in a memory device to which it is communicatively coupled. A further module may then, at a later time, access the memory device to retrieve and process the stored output. Modules may also initiate communications with input or output devices, and can operate on a resource (e.g., a collection of information).

Component Design

Some example embodiments may include the above illustrated tiers, and processes or operations that make them up, as being written as one or more software components. Common too many of these components is the ability to generate, use, and manipulate data. These components, and the functionality associated with each, may be used by client, server, or peer computer systems. These various components may be implemented by a computer system on an as-needed basis. These components may be written in an object-oriented computer language such that a component oriented, or object-oriented programming technique can be implemented using a Visual Component Library (VCL), Component Library for Cross Platform (CLX), Java Beans (JB), Java Enterprise Beans (EJB), Component Object Model (COM), Distributed Component Object Model (DCOM), or other suitable technique. These components may be linked to other components via various Application Programming interfaces (APIs), and then compiled into one complete server, client, and/or peer software application. Further, these APIs may be able to communicate through various distributed programming protocols as distributed computing components.

Distributed Computing Components and Protocols

Some example embodiments may include remote procedure calls being used to implement one or more of the above illustrated components across a distributed programming environment as distributed computing components. For example, an interface component (e.g., an interface tier) may reside on a first computer system that is remotely located from a second computer system containing a logic component (e.g., a logic tier). These first and second computer systems may be configured in a server-client, peer-to-peer, or some other suitable configuration. These various components may be written using the above illustrated object-oriented programming techniques, and can be written in the same programming language, or a different programming language. Various protocols may be implemented to enable these various components to communicate regardless of the programming language used to write these components. For example, an component written in C++ may be able to communicate with another component written in the Java programming language through utilizing a distributed computing protocol such as a Common Object Request Broker Architecture (CORBA), a Simple Object Access Protocol (SOAP), or some other suitable protocol. Some embodiments may include the use of one or more of these protocols with the various protocols outlined in the OSI model, or TCP/IP protocol stack model for defining the protocols used by a network to transmit data.

A System of Transmission Between a Server and Client

Some embodiments may utilize the OSI model or TCP/IP protocol stack model for defining the protocols used by a network to transmit data. In applying these models, a system of data transmission between a server and client, or between peer computer systems is illustrated as a series of roughly five layers comprising: an application layer, a transport layer, a network layer, a data link layer, and a physical layer. In the case of software having a three tier architecture, the various tiers (e.g., the interface, logic, and storage tiers) reside on the application layer of the TCP/IP protocol stack. In an example implementation using the TCP/IP protocol stack model, data from an application residing at the application layer is loaded into the data load field of a TCP segment residing at the transport layer. This TCP segment also contains port information for a recipient software application residing remotely. This TCP segment is loaded into the data load field of an IP datagram residing at the network layer. Next, this IP datagram is loaded into a frame residing at the data link layer. This frame is then encoded at the physical layer, and the data transmitted over a network such as an internet, Local Area Network (LAN), Wide Area Network (WAN), or some other suitable network. In some cases, internet refers to a network of networks. These networks may use a variety of protocols for the exchange of data, including the aforementioned TCP/IP, and additionally ATM, SNA, SDI, or some other suitable protocol. These networks may be organized within a variety of topologies (e.g., a star topology), or structures.

The Abstract of the Disclosure is provided to comply with 37 C.F.R. § 1.72(b), requiring an abstract that may allow the reader to quickly ascertain the nature of the technical disclosure. It is submitted with the understanding that it may not be used to interpret or limit the scope or meaning of the claims. In addition, in the foregoing Detailed Description, it can be seen that various features are grouped together in a single embodiment for the purpose of streamlining the disclosure. This method of disclosure is not to be interpreted as reflecting an intention that the claimed embodiments require more features than are expressly recited in each claim. Rather, as the following claims reflect, inventive subject matter lies in less than all features of a single disclosed embodiment. Thus the following claims are hereby incorporated into the Detailed. Description, with each claim standing on its own as a separate embodiment.

What is claimed is:

1. A system comprising:
one or more computer processors;
one or more computer memories;
one or more instructions included in the one or more memories, the one or more instructions configuring the one or more computer processors to perform operations for controlling access to listings owned by a user, the operations comprising:
identifying the listings owned by the user;
presenting the listings in a user interface on a client device of the user, the presenting including providing selectable user interface elements for setting configurable parameters corresponding to each of the listings, each of the configurable parameters corresponding to one of a set of types of relationships between the user and other users in a social network;
based on a selection of a first parameter of the configurable parameters, the first parameter corresponding to a first type of the set of types of relationships between the user and the other users, causing a maximum amount of item information to be displayed on client devices of the other users that are of the first type;
based on a selection of a second parameter of the configurable parameters, the second corresponding to a second one of the set of types of relationships, causing a minimum amount of item information to be displayed on client devices of the other users that are of the second type.

2. The system of claim 1, wherein the first parameter is a summary disclosure parameter.

3. The system of claim 1, wherein the second parameters is a teaser disclosure parameter.

4. The system of claim 1, wherein the maximum amount of item information includes a photograph and text.

5. The system of claim 1, wherein the minimum amount of item information does not include text, but does include one of a photograph, graphic, or picture.

6. The system of claim 1, wherein the minimum amount of information is one or more of a description of the item, highest bid for the item, or auction end time for the item.

7. The system of claim 1, wherein the maximum amount of item information includes at least one of a title, a description, a reserve price, a highest bid, a purchase price; or a graphic.

8. A method for controlling access to listings owned by a user, the method comprising:
Identifying, using one or more computer processors, the listings owned by the user;
presenting, using the one or more computer processors, the listings in a user interface on a client device of the user, the presenting including providing selectable user interface elements for setting configurable parameters corresponding to each of the listings, each of the configurable parameters corresponding to one of a set of types of relationships between the user and other users in a social network;
based on a selection of a first parameter of the configurable parameters, the first parameter corresponding to a first type of the set of types of relationships between the user and the other users, causing, using the one or more computer processors, a maximum amount of item information to be displayed on client devices of the other users that are of the first type;
based on a selection of a second parameter of the configurable parameters, the second corresponding to a second one of the set of types of relationships, causing, using the one or more computer processors, a minimum amount of item information to be displayed on client devices of the other users that are of the second type.

9. The method of claim 8, wherein the first parameter is a summary disclosure parameter.

10. The method of claim 8, wherein the second parameters is a teaser disclosure parameter.

11. The method of claim 8, wherein the maximum amount of item information includes a photograph and text.

12. The method of claim 8, wherein the minimum amount of item information does not include text, but does include one of a photograph, graphic, or picture.

13. The method of claim 8, wherein the minimum amount of information is one or more of a description of the item; highest bid for the item, or auction end time for the item.

14. The method of claim 8, wherein the maximum amount of item information includes at least one of a title, a description, a reserve price, a highest bid, a purchase price, or a graphic.

15. A non-transitory machine-readable medium comprising a set of instructions that, when executed by one or more computer processors, causes the one or more computer processors to perform operations for controlling access to listings owned by a user, the operations comprising:
Identifying the listings owned by the user;
presenting the listings in a user interface on a client device of the user, the presenting including providing selectable user interface elements for setting configurable parameters corresponding to each of the listings, each of the configurable parameters corresponding to one of a set of types of relationships between the user and other users in a social network;
based on a selection of a first parameter of the configurable parameters, the first parameter corresponding to a first type of the set of types of relationships between the user and the other users, causing a maximum amount of item information to be displayed on client devices of the other users that are of the first type;
based on a selection of a second parameter of the configurable parameters, the second corresponding to a second one of the set of types of relationships, causing a minimum amount of item information to be displayed on client devices of the other users that are of the second type.

16. The non-transitory machine-readable medium of claim 15, wherein the first parameter is a summary disclosure parameter.

17. The non-transitory machine-readable medium of claim 15, wherein the second parameters is a teaser disclosure parameter.

18. The non-transitory machine-readable medium of claim 15, wherein the maximum amount of item information includes a photograph and text.

19. The non-transitory machine-readable medium of claim 15, wherein the minimum amount of item information does not include text, but does include one of a photograph, graphic, or picture.

20. The non-transitory machine-readable medium of claim 15, wherein the minimum amount of information is one or more of a description of the item, highest bid for the item, or auction end time for the item.

* * * * *